US012587351B2

(12) United States Patent
Ikegami et al.

(10) Patent No.: US 12,587,351 B2
(45) Date of Patent: Mar. 24, 2026

(54) TRANSMISSION AND RECEPTION MODULE

(71) Applicant: Murata Manufacturing Co., Ltd., Kyoto (JP)

(72) Inventors: Katsuya Ikegami, Kyoto (JP); Kazuhiro Ikarashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 678 days.

(21) Appl. No.: 17/812,473

(22) Filed: Jul. 14, 2022

(65) Prior Publication Data

US 2023/0017554 A1      Jan. 19, 2023

(30) Foreign Application Priority Data

Jul. 16, 2021    (JP) ................................. 2021-118290

(51) Int. Cl.
H04L 5/14          (2006.01)

(52) U.S. Cl.
CPC ..................................... H04L 5/14 (2013.01)

(58) Field of Classification Search
CPC . H04L 5/14; H03H 7/38; H03H 7/463; H03H 2001/0085; H04B 1/006; H04B 1/0458; H04B 1/18; H04B 1/525
See application file for complete search history.

(56) References Cited

U.S. PATENT DOCUMENTS

| | | |
|---|---|---|
| 2015/0028963 A1 | 1/2015 | Ebihara et al. |
| 2017/0179890 A1* | 6/2017 | Kranz ....................... H03F 3/19 |
| 2018/0287582 A1* | 10/2018 | Matsumoto ............ H03H 9/725 |
| 2019/0131051 A1* | 5/2019 | Mukai .................. H03H 9/0566 |
| 2020/0228151 A1* | 7/2020 | Naniwa ................ H05K 1/0237 |
| 2021/0152210 A1* | 5/2021 | Uejima .................... H04B 1/18 |
| 2022/0246345 A1* | 8/2022 | Kita .......................... H04B 1/00 |

FOREIGN PATENT DOCUMENTS

| | | | | |
|---|---|---|---|---|
| JP | 2015-023557 A | | 2/2015 | |
| JP | 2020182128 A | * | 11/2020 | |
| WO | WO-2021124691 A1 | * | 6/2021 | ......... H01F 27/2885 |

* cited by examiner

*Primary Examiner* — Moo Jeong
*Assistant Examiner* — David Zhijun Sun
(74) *Attorney, Agent, or Firm* — McDonald Hopkins LLC

(57)          ABSTRACT

A transmission and reception module includes a substrate including a transmission signal input terminal, a reception signal output terminal, and an antenna terminal, a duplexer that is provided on the substrate, outputs a transmission signal input from the transmission signal input terminal to the antenna terminal, and outputs a reception signal input from the antenna terminal to the reception signal output terminal, a first inductor included in a first matching circuit provided between the duplexer and the antenna terminal, and a second inductor included in a second matching circuit provided between the duplexer and the reception signal output terminal. On the substrate, a winding axis direction of a conductor of the first inductor and a winding axis direction of a conductor of the second inductor are different from each other.

13 Claims, 26 Drawing Sheets

TRANSMISSION AND RECEPTION MODULE

CROSS REFERENCE TO RELATED APPLICATION

This application claims priority from Japanese Patent Application No. 2021-118290 filed on Jul. 16, 2021. The content of this application is incorporated herein by reference in its entirety.

BACKGROUND ART

The present disclosure relates to a transmission and reception module.

In recent years, a transmission and reception module in which a power amplifier circuit, a switch circuit, a control circuit, and the like are integrated has been developed. In such a transmission and reception module, a plurality of functional devices, such as a wafer level chip size package (WL-CSP) and a surface mount device (SMD) is mounted on a low temperature co-fired ceramics (LTCC) substrate or a dielectric substrate. For example, there is disclosed a configuration in which a frequency division duplex (FDD) scheme realizes a wider bandwidth and higher speed by carrier aggregation (CA) (for example, Japanese Unexamined Patent Application Publication No. 2015-23557).

In a transmission and reception module that handles a plurality of communication bands, a matching circuit for impedance matching is provided between circuits. In such a configuration, magnetic flux coupling is generated between inductors included in the respective matching circuits, which may cause degradation of isolation characteristics and attenuation characteristics of a transmission and reception path.

BRIEF SUMMARY

The present disclosure provides a transmission and reception module capable of suppressing degradation of isolation characteristics and attenuation characteristics of a transmission and reception path.

A transmission and reception module according to an aspect of the present disclosure includes: a substrate including a transmission signal input terminal, a reception signal output terminal, and an antenna terminal; a duplexer that is provided on the substrate, outputs a transmission signal input from the transmission signal input terminal to the antenna terminal, and outputs a reception signal input from the antenna terminal to the reception signal output terminal; a first inductor included in a first matching circuit provided between the duplexer and the antenna terminal; and a second inductor included in a second matching circuit provided between the duplexer and the reception signal output terminal, in which on the substrate, a winding axis direction of a conductor of the first inductor and a winding axis direction of a conductor of the second inductor are different from each other.

According to the present disclosure, it is possible to realize a transmission and reception module capable of suppressing degradation of isolation characteristics and attenuation characteristics of a transmission and reception path.

BRIEF DESCRIPTION OF THE DRAWINGS

FIG. 21 is a diagram illustrating an example of the arrangement mode of the first inductor and the second inductor on the substrate in the specific example illustrated in FIG. 20;

3

Figure 24:
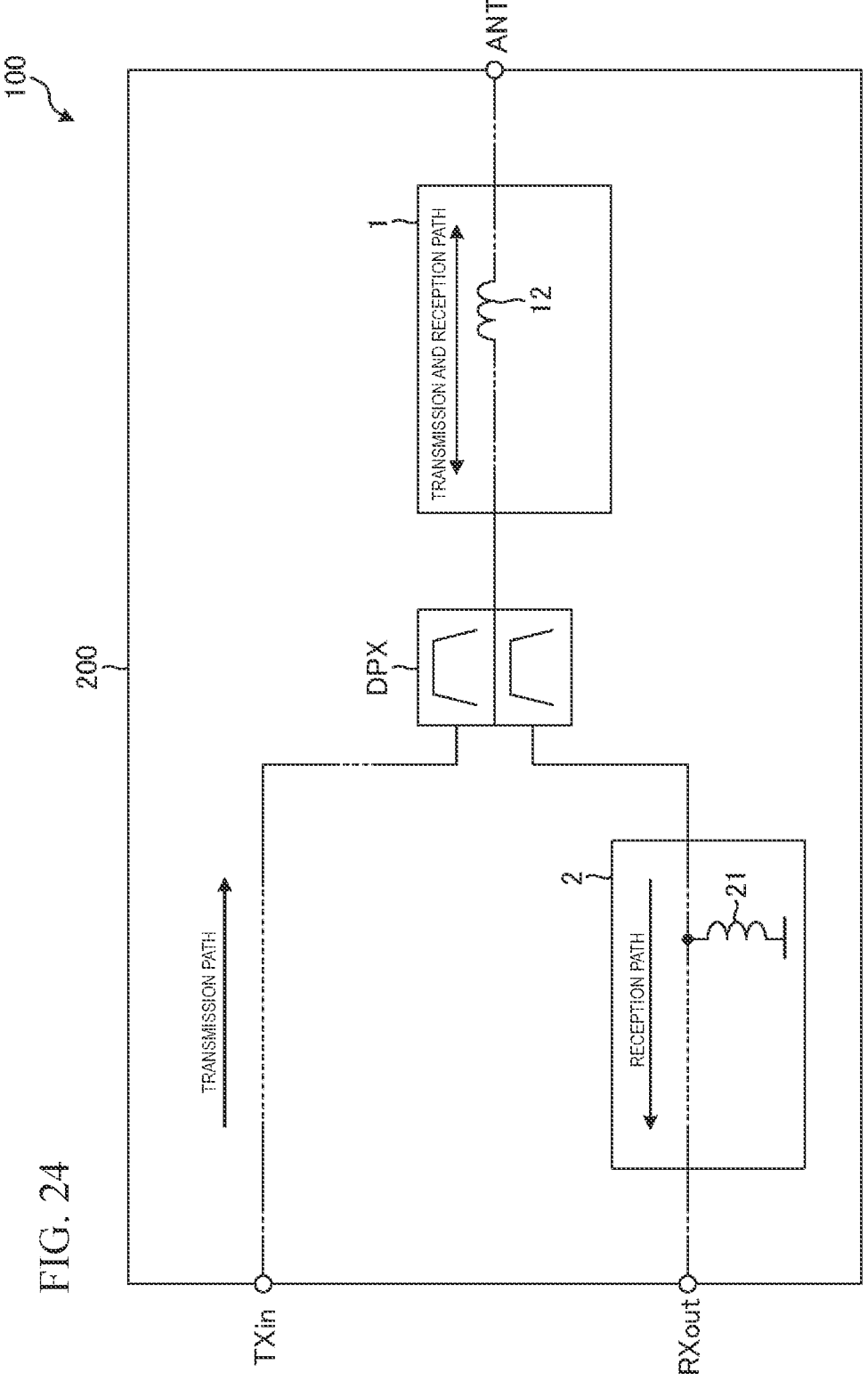
FIG. 24 is a third diagram illustrating a specific example of the configuration of the first inductor and the second inductor according to the embodiment.
Figure 25:
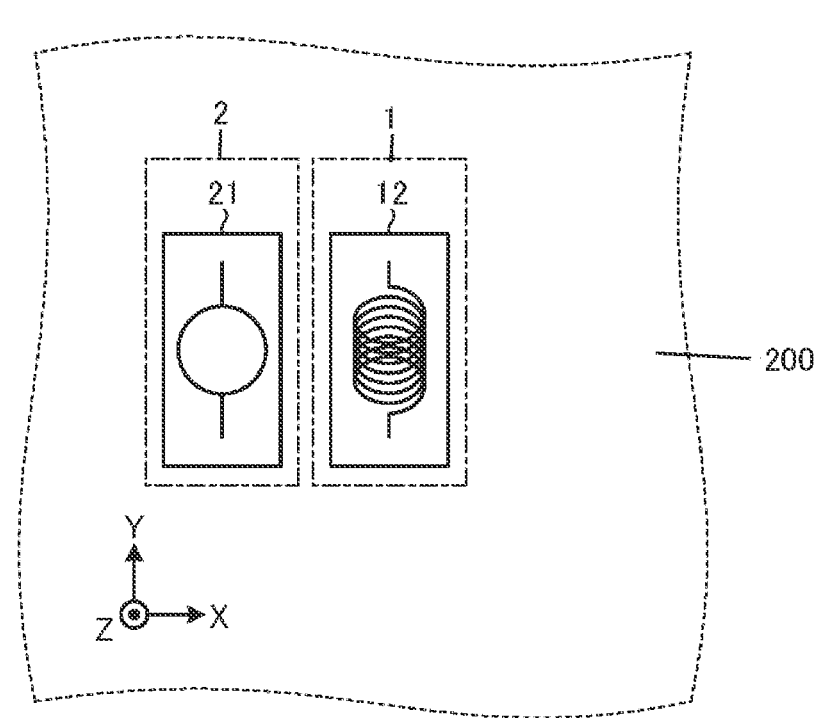
Figure 26:
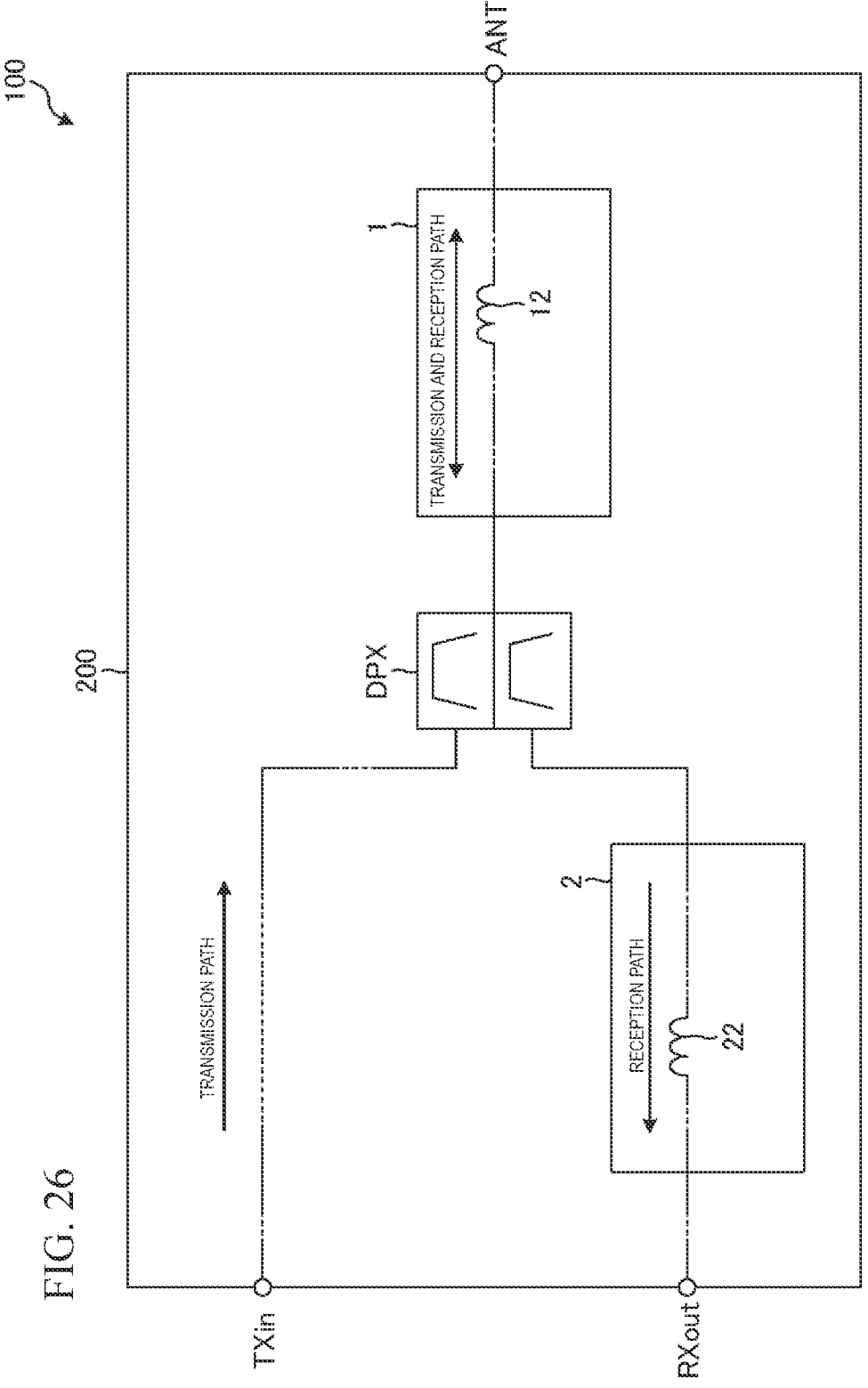
Figure 28:
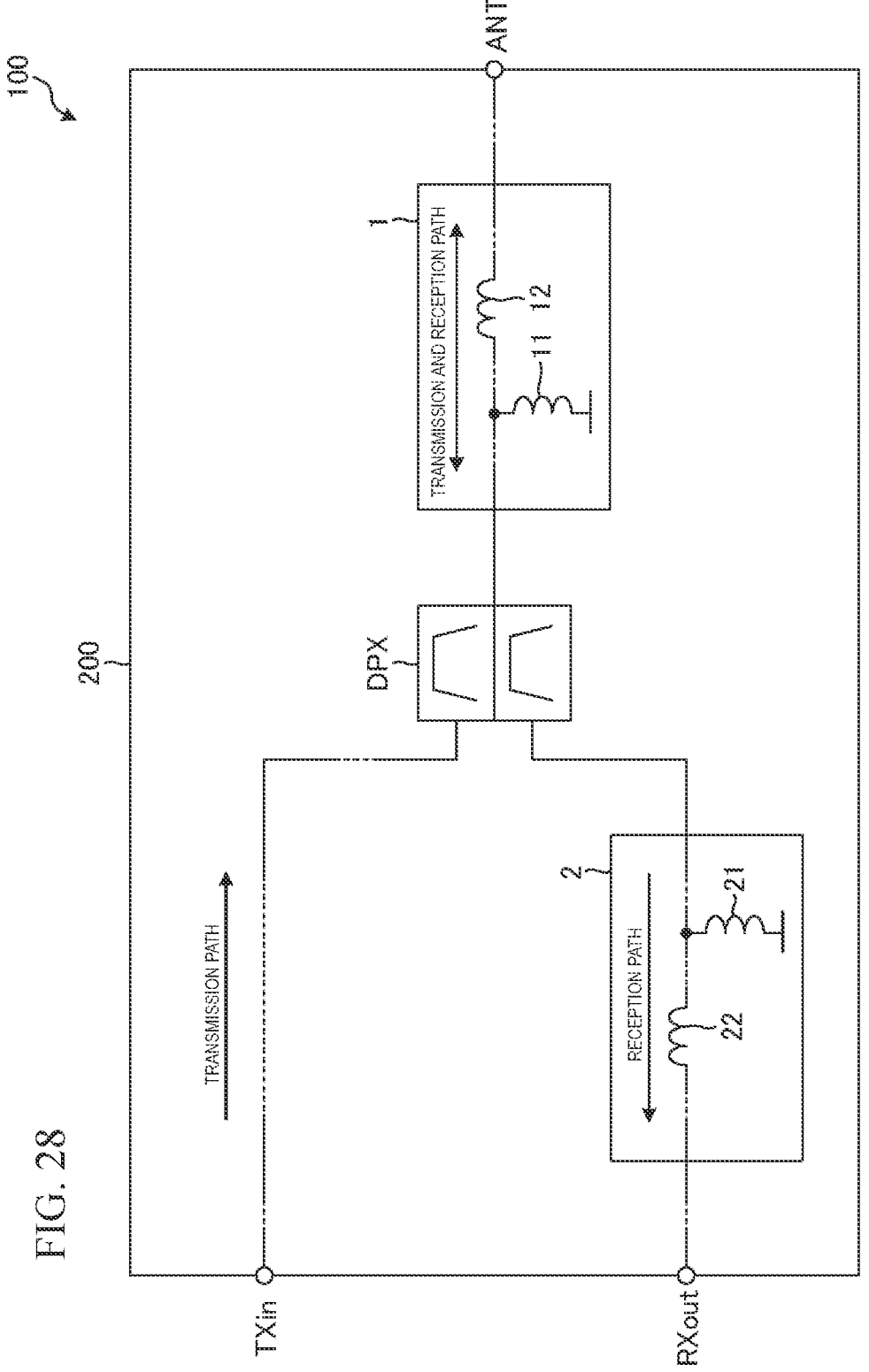
Figure 29:
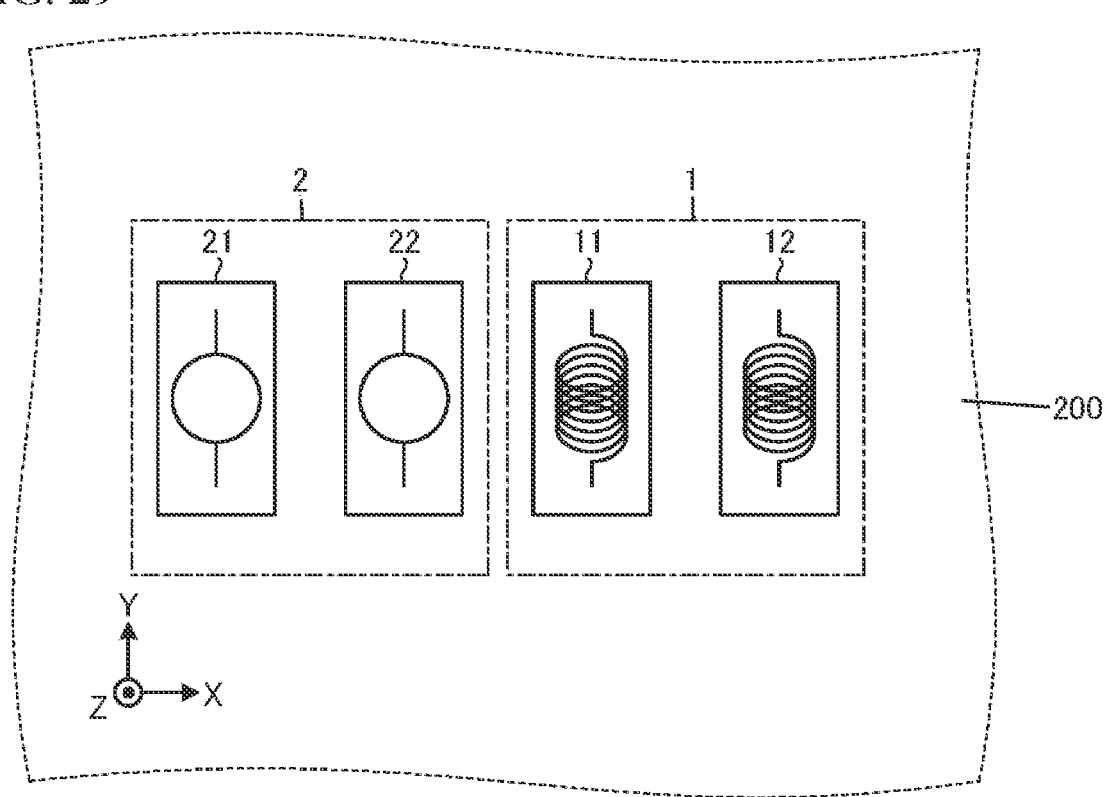
Figure 30:
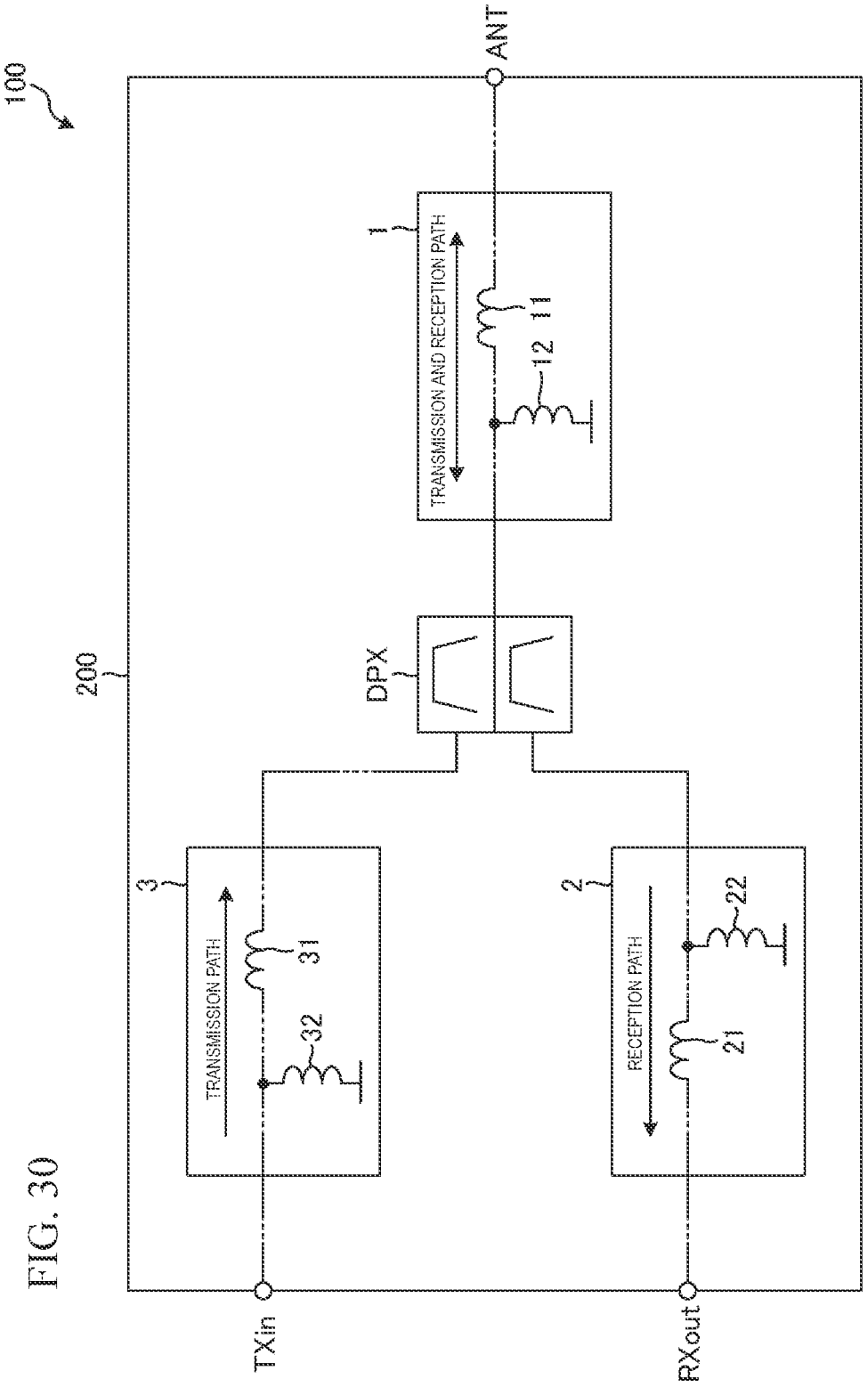
Figure 31:
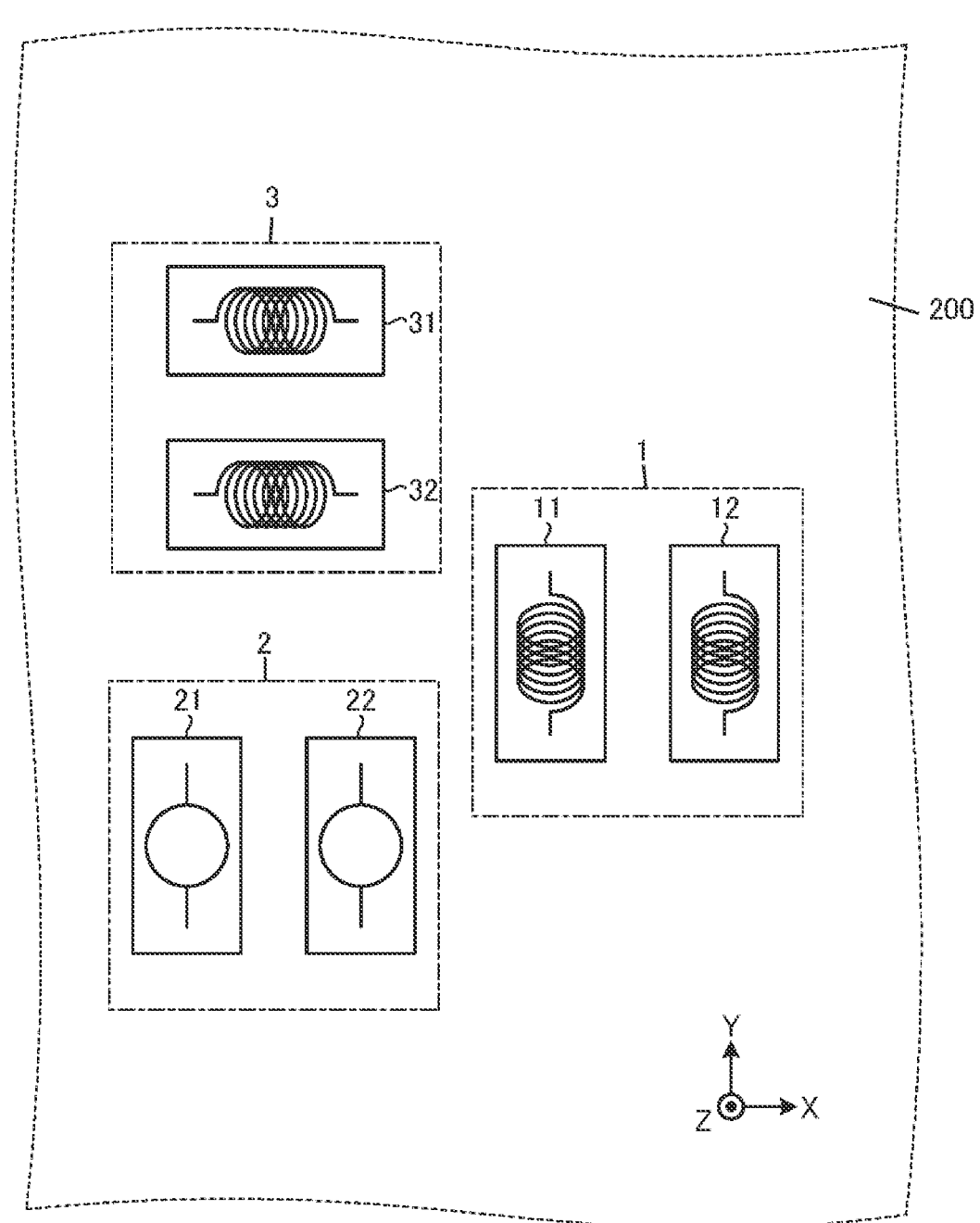
Figure 32:
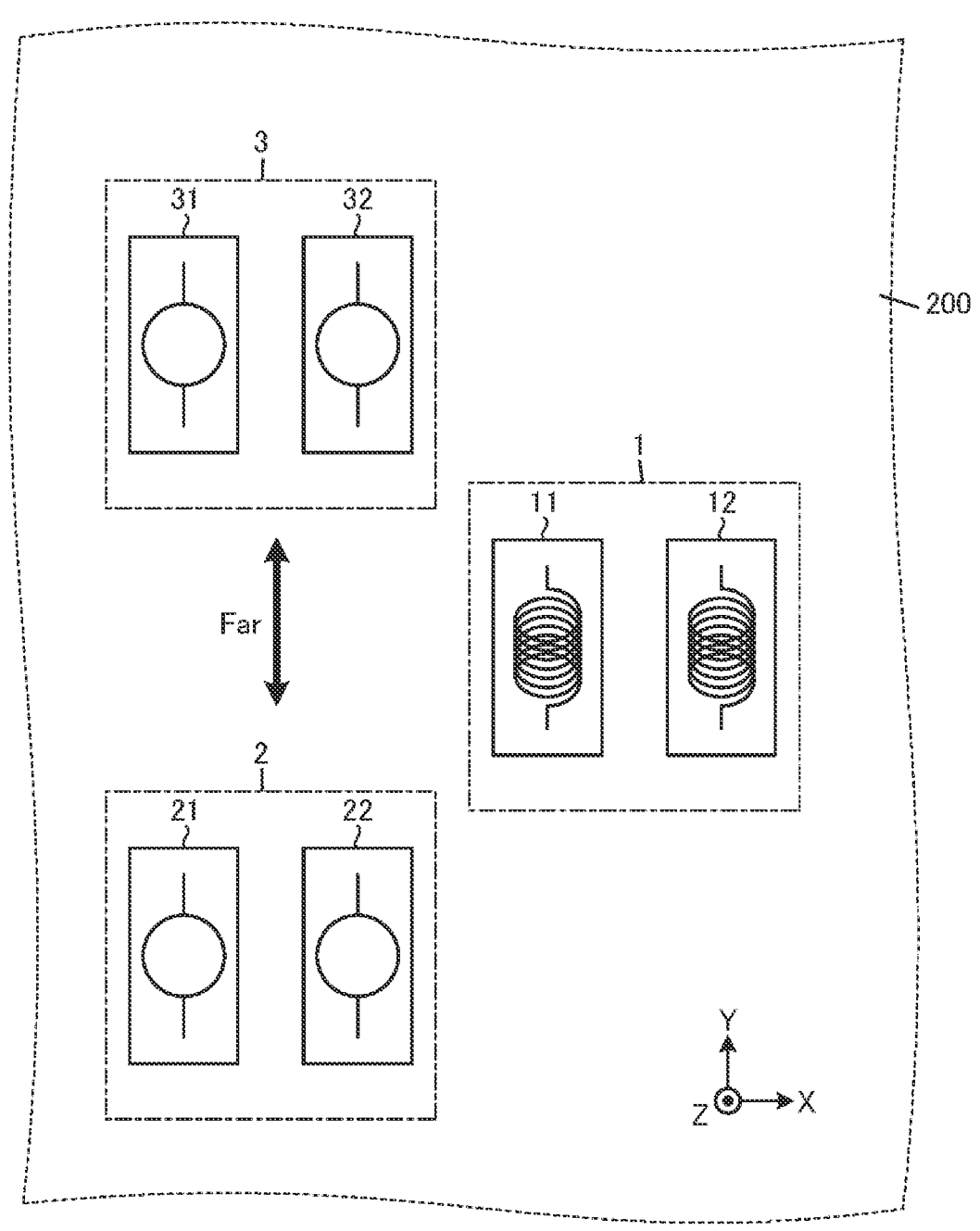
Figure 33:
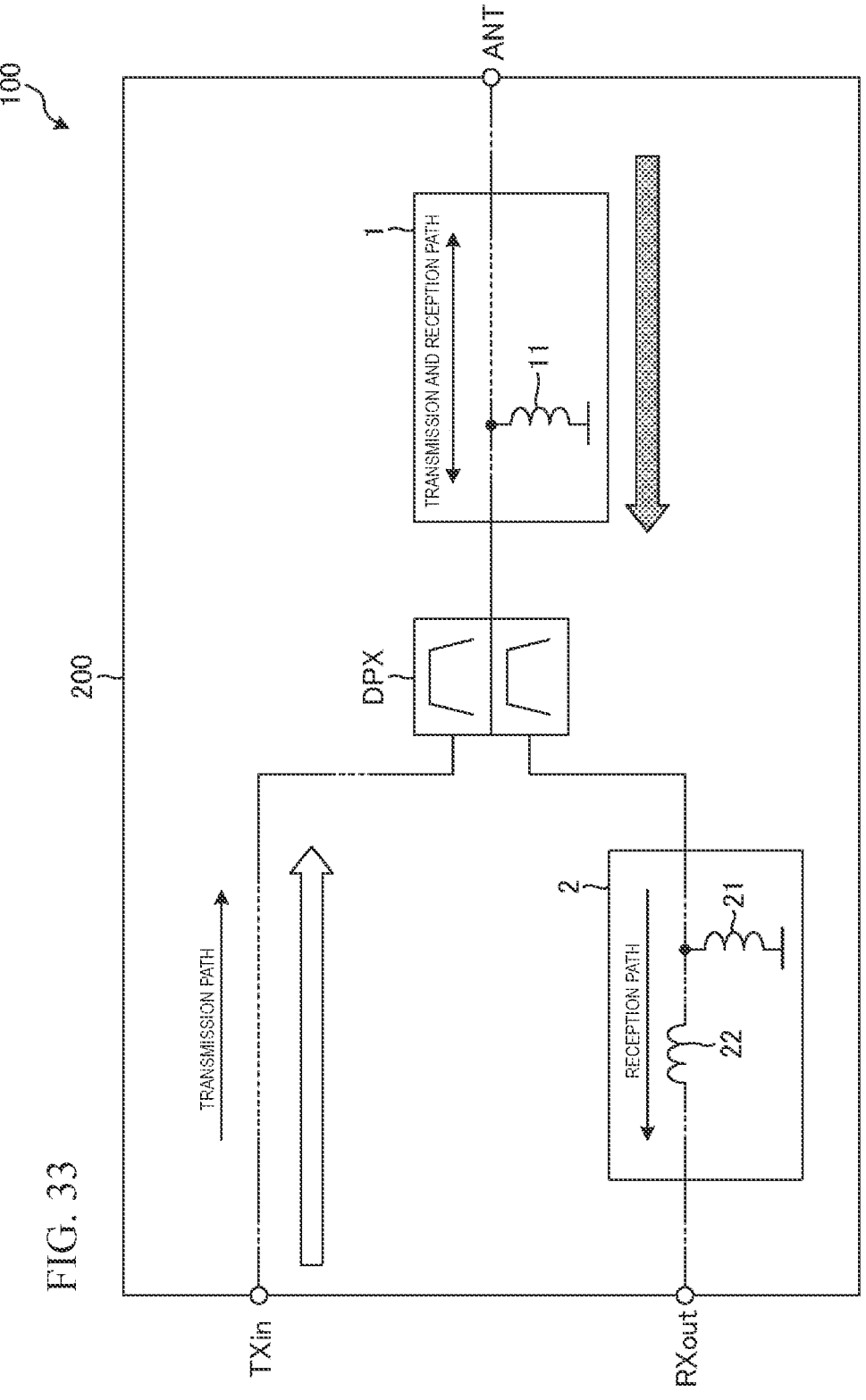
Figure 34:
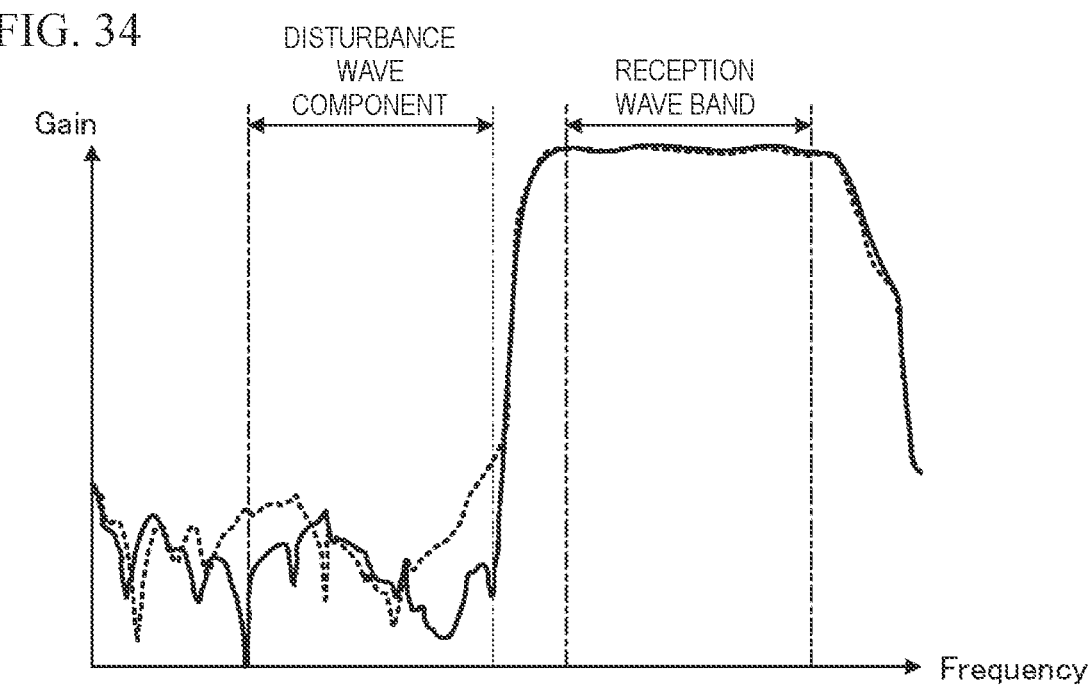
Figure 35:
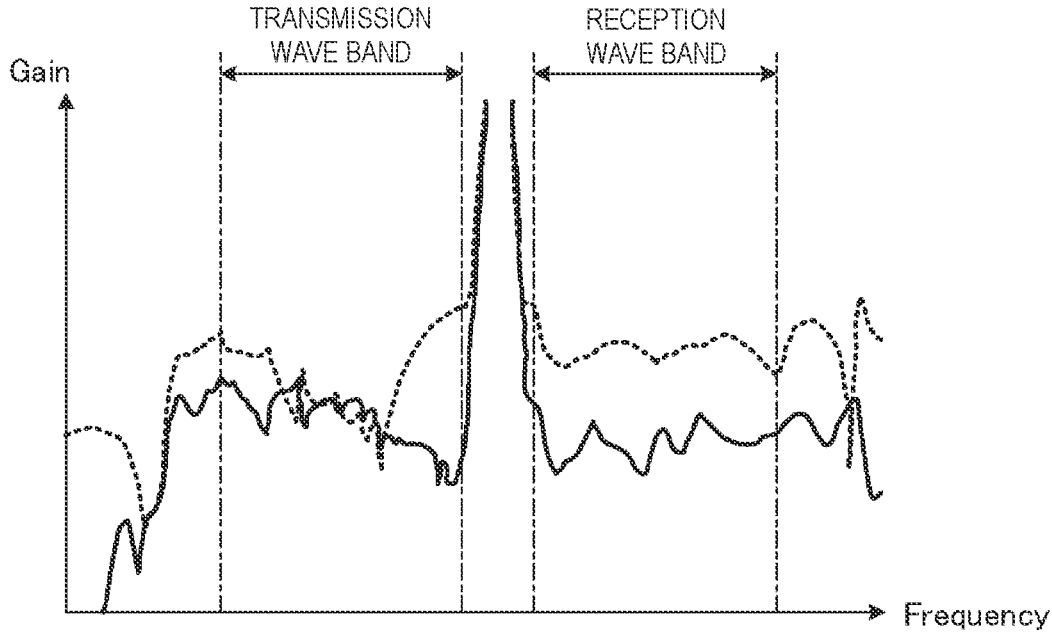

FIG. 25 is a diagram illustrating an example of the arrangement mode of the first inductor and the second inductor on the substrate in the specific example illustrated in FIG. 24;

FIG. 26 is a fourth diagram illustrating a specific example of the configuration of the first inductor and the second inductor according to the embodiment;

Figure 27:
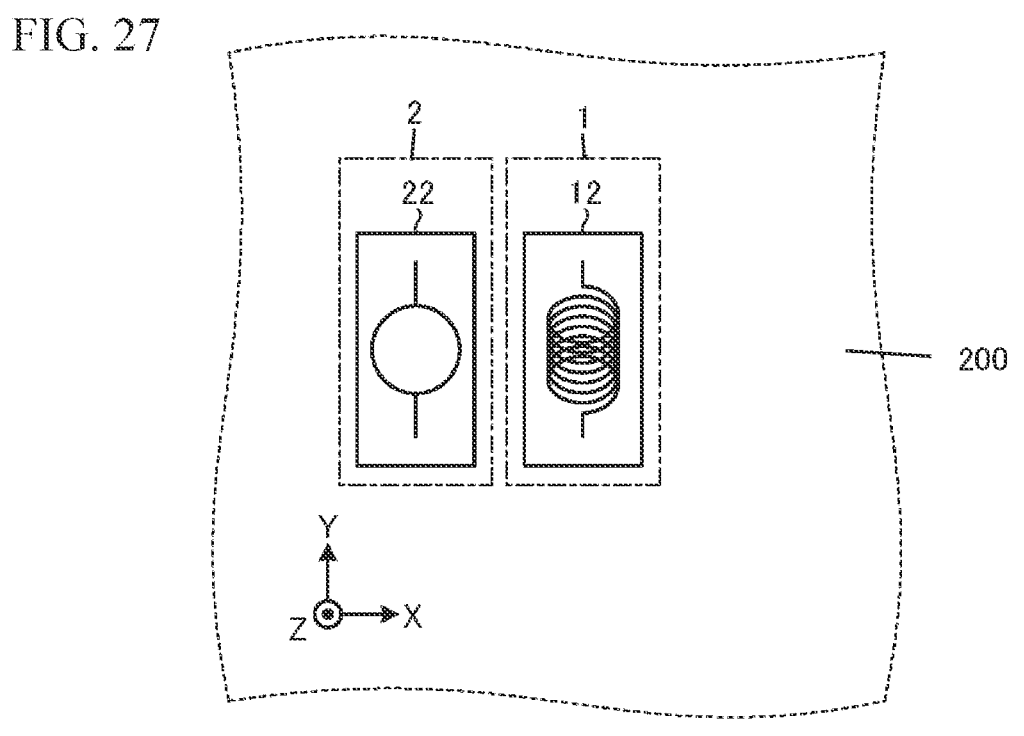

FIG. 27 is a diagram illustrating an example of the arrangement mode of the first inductor and the second inductor on the substrate in the specific example illustrated in FIG. 26;

FIG. 28 is a fifth diagram illustrating a specific example of the configuration of the first inductor and the second inductor according to the embodiment;

FIG. 29 is a diagram illustrating an example of the arrangement mode of the first inductor and the second inductor on the substrate in the specific example illustrated in FIG. 28;

FIG. 30 is a diagram illustrating a specific example of the configuration of the first inductor, the second inductor, and a third inductor according to the embodiment;

FIG. 31 is a first diagram illustrating an example of the arrangement mode of the first inductor, the second inductor, and the third inductor on the substrate in the specific example illustrated in FIG. 30;

FIG. 32 is a second diagram illustrating an example of the arrangement mode of the first inductor, the second inductor, and the third inductor on the substrate in the specific example illustrated in FIG. 30;

FIG. 33 is a diagram illustrating a specific example of the configuration of the first inductor and the second inductor for explaining the effect of the inductor arrangement according to the embodiment;

FIG. 34 is a diagram illustrating an example of simulation results of the attenuation performance between an antenna terminal and a reception signal output terminal in the configuration illustrated in FIG. 33; and FIG. 35 is a diagram illustrating an example of simulation results of the isolation performance between a transmission signal input terminal and the reception signal output terminal in the configuration illustrated in FIG. 33.

DETAILED DESCRIPTION

Hereinafter, a transmission and reception module according to an embodiment will be described in detail with reference to the accompanying drawings. It should be noted that the present disclosure is not limited by this embodiment.

Figure 1:
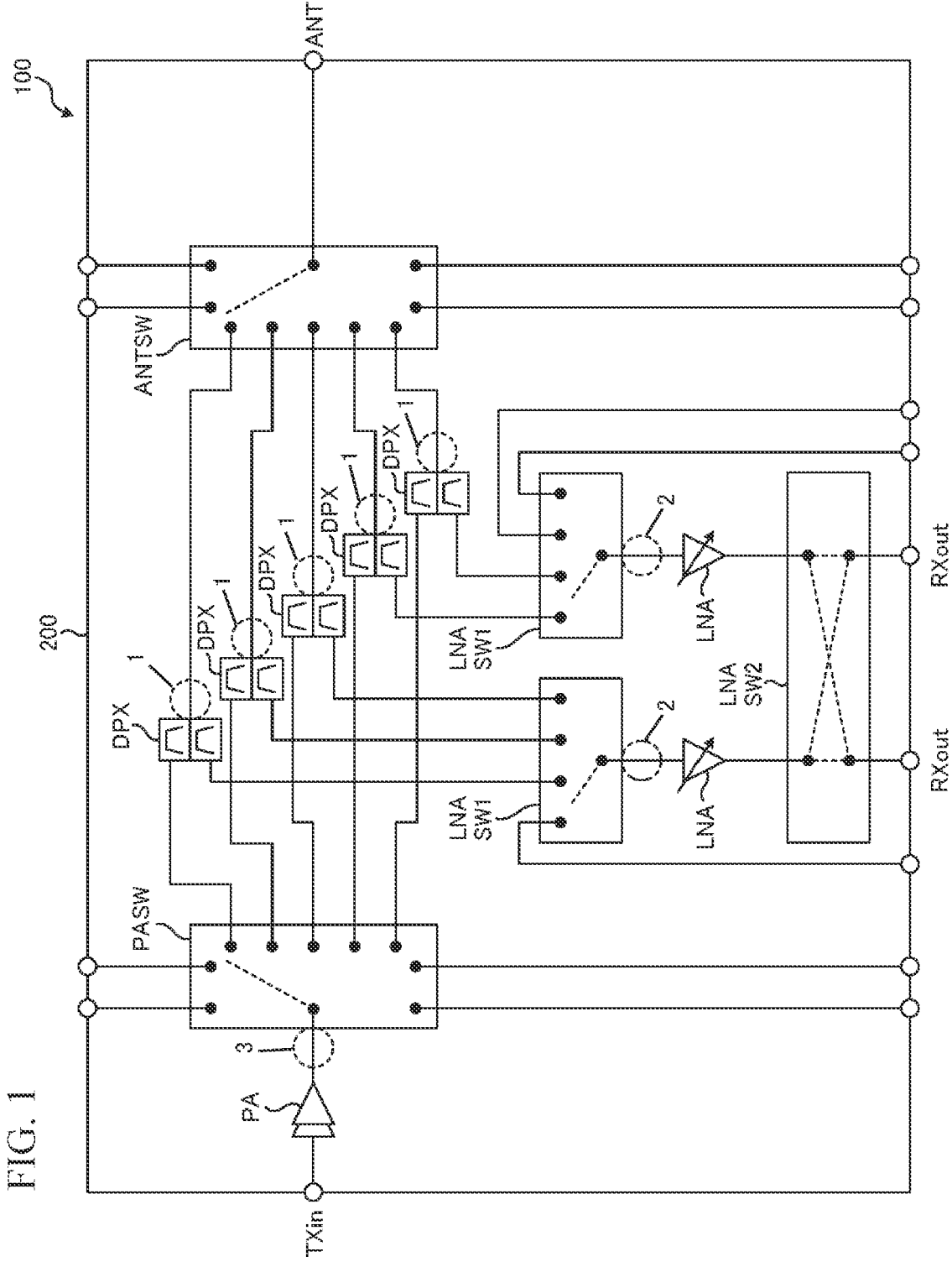
FIG. 1 is a schematic diagram illustrating a configuration example of a transmission and reception module according to an embodiment.

FIG. 1 is a schematic diagram illustrating a configuration example of a transmission and reception module according to the embodiment.

A transmission and reception module 100 is a micro-integrated module in which a plurality of integrated circuits mounted on a substrate 200 and various functional components are integrated. Examples of the substrate 200 include a ceramic laminated substrate, such as a low temperature co-fired ceramics (LTCC) substrate, a resin multilayer substrate, a film substrate, and the like.

The transmission and reception module 100 illustrated in FIG. 1 is configured to include a plurality of duplexers DPX for implementing carrier aggregation (CA) for simultaneously transmitting and receiving signals in a plurality of bands by a frequency division duplex (FDD) scheme, E-UTRAN New Radio-Dual Connectivity (EN-DC), or the like, for example. The plurality of duplexers DPX has different pass bands.

Different frequencies are assigned to the duplexers DPX for transmission and reception. The duplexer DPX is configured by a surface mount device (SMD) formed by, for example, a ceramic-based surface acoustic wave (SAW) filter. Note that each of the duplexers DPX may be configured by an SMD formed by a bulk acoustic wave (BAW) filter or an LC filter.

A transmission signal input from a transmission signal input terminal TXin is amplified by a power amplifier circuit PA, appropriately switched by a power amplifier output switch circuit PASW, and input to each duplexer DPX. The transmission signal output from each duplexer DPX is appropriately switched by an antenna switch circuit ANTSW and output from an antenna terminal ANT. In the present disclosure, an output impedance matching circuit 3 (hereinafter also referred to as a "third matching circuit 3") is provided on the output side of the power amplifier circuit PA. Specifically, the matching circuit 3 is provided between the transmission signal input terminal TXin and the antenna switch circuit ANTSW. In other words, the matching circuit 3 includes at least one of an impedance element inserted in series in a path connecting the transmission signal input terminal TXin and the antenna switch circuit ANTSW and an impedance element inserted in series between a path connecting the transmission signal input terminal TXin and the antenna switch circuit ANTSW and the ground. Note that the transmission and reception module 100 may include, between the antenna switch circuit ANTSW and the antenna terminal ANT, an input/output filter circuit, such as a low-pass filter that suppresses a high-order harmonic wave component including a second harmonic wave component of a transmission signal or a reception signal handled by the transmission and reception module 100.

A reception signal input from the antenna terminal ANT is appropriately switched by the antenna switch circuit ANTSW and input to each duplexer DPX. The reception signal output from each duplexer DPX is appropriately switched by a low-noise amplifier input switch LNASW 1, input to a low-noise amplifier circuit LNA, and output from the reception signal output terminal RXout via a low-noise amplifier output switch LNASW 2. In the present disclosure, an antenna impedance matching circuit 1 (hereinafter also referred to as a "first matching circuit 1") is provided on the antenna terminal side of each duplexer DPX, and an input impedance matching circuit 2 (hereinafter also referred to as a "second matching circuit 2") is provided on the input side of the low-noise amplifier circuit LNA. Specifically, the matching circuit 2 is provided between the reception signal output terminal RXout and the antenna switch circuit ANTSW. In other words, the matching circuit 2 includes at least one of an impedance element inserted in series in a path connecting the reception signal output terminal RXout and the antenna switch circuit ANTSW and an impedance element inserted in series between a path connecting the reception signal output terminal RXout and the antenna switch circuit ANTSW and the ground.

Each of the power amplifier circuit PA, the low-noise amplifier circuit LNA, the power amplifier output switch circuit PASW, the low-noise amplifier input switch LNASW 1, the low-noise amplifier output switch LNASW 2, and the antenna switch circuit ANTSW includes a functional IC (not illustrated). Each of these functional ICs is configured by, for example, a wafer level CSP (WL-CSP: Wafer Level Chip Size Package), and is bump-bonded on the substrate 200 of the transmission and reception module 100 by, for example, a copper pillar or the like. Note that two or more circuits among the power amplifier circuit PA, the low-noise amplifier circuit LNA, the power amplifier output switch circuit PASW, the low-noise amplifier input switch LNASW 1, the low-noise amplifier output switch LNASW 2, and the antenna switch circuit ANTSW may be provided in the same IC circuit.

Figure 2:
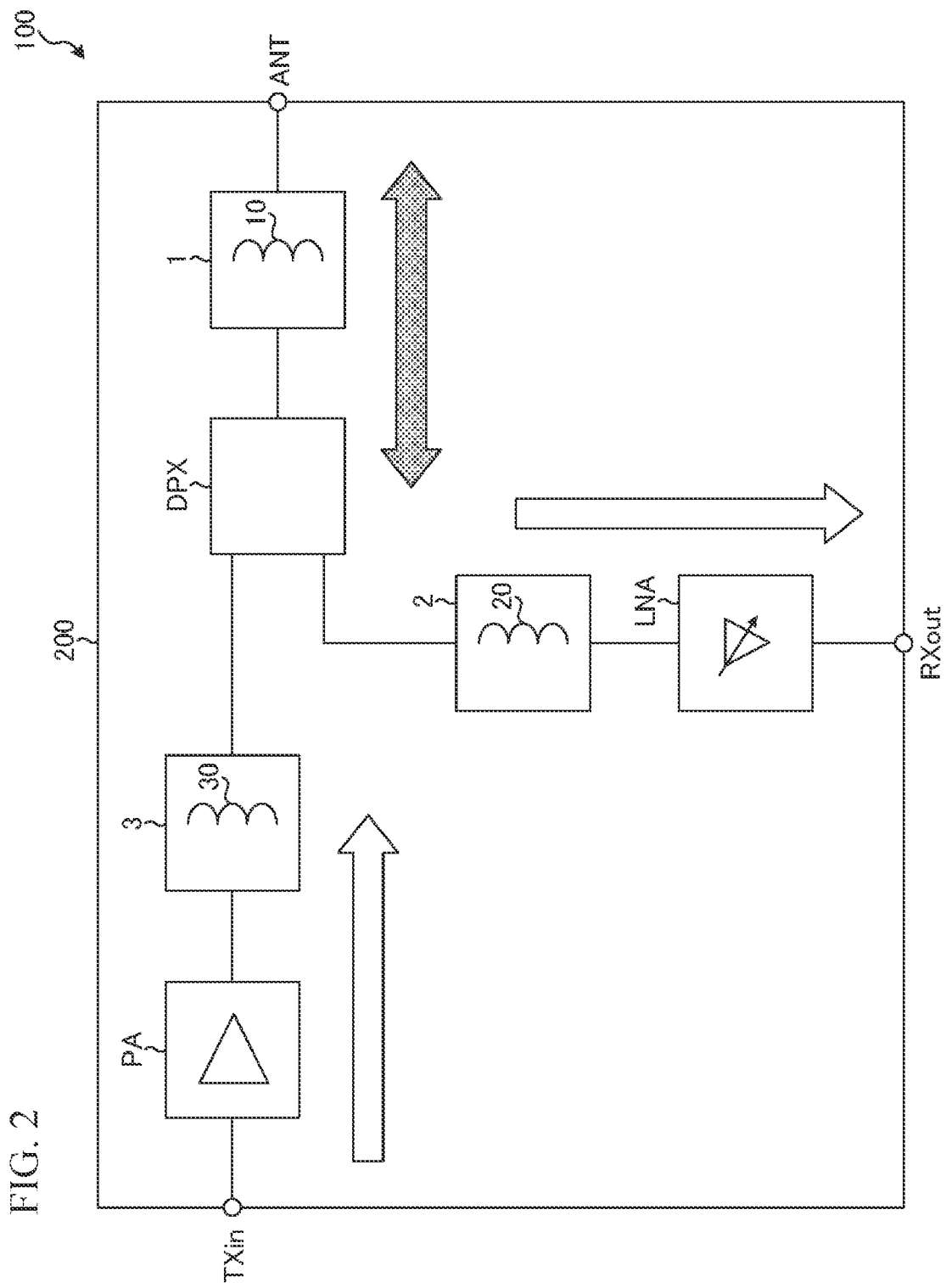
FIG. 2 is a diagram schematically illustrating matching circuits on a substrate of the transmission and reception module according to the embodiment.

FIG. 2 is a diagram schematically illustrating each matching circuit on the substrate of the transmission and reception module according to the embodiment. As illustrated in FIG. 2, the first matching circuit 1 includes a first inductor 10, the second matching circuit 2 includes a second inductor 20, and the third matching circuit 3 includes a third inductor 30.

Figure 3:
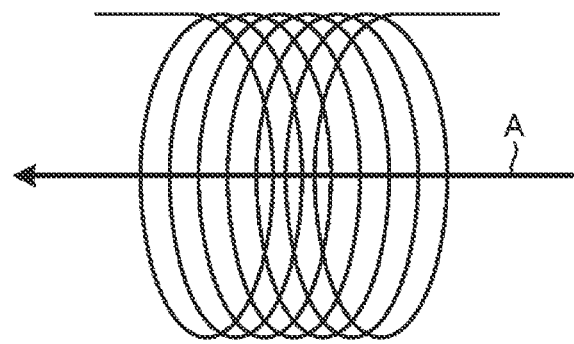
FIG. 3 is a schematic diagram of an inductor.

FIG. 3 is a schematic diagram of an inductor. The first inductor 10 of the first matching circuit 1, the second inductor 20 of the second matching circuit 2, and the third inductor 30 of the third matching circuit 3 each has, for example, a wire-wound structure in which a wire is wound around a ceramic core, a film-type structure in which a film-shaped conductor is used, or a laminated structure in which coil patterns are laminated. That is, each of the first inductor 10, the second inductor 20, and the third inductor 30 according to the present disclosure has, for example, a coiled structure in which a conductor is wound as illustrated in FIG. 3. Note that the first inductor 10, the second inductor 20, and the third inductor 30 may have a spiral structure in which the conductor is wound on the same plane.

In an inductor in which such a conductor is wound, when a current flows, as illustrated in FIG. 3, a magnetic flux is generated in a winding axis direction A of the conductor (a direction indicated by an arrow in FIG. 3). When a plurality of inductors is arranged on the substrate 200, a mutual inductance component due to magnetic flux coupling is generated between the inductors, and there is a possibility that attenuation performance of the transmission signal or the reception signal or isolation performance between the transmission signal and the reception signal is degraded.

Specifically, in the configuration of the transmission and reception module 100 according to the embodiment illustrated in FIG. 1, the first inductor 10 of the first matching circuit 1 provided on the antenna terminal ANT side of each duplexer DPX and the second inductor 20 of the second matching circuit 2 provided on the input side of the low-noise amplifier circuit LNA may be disposed close to each other.

Figure 4:
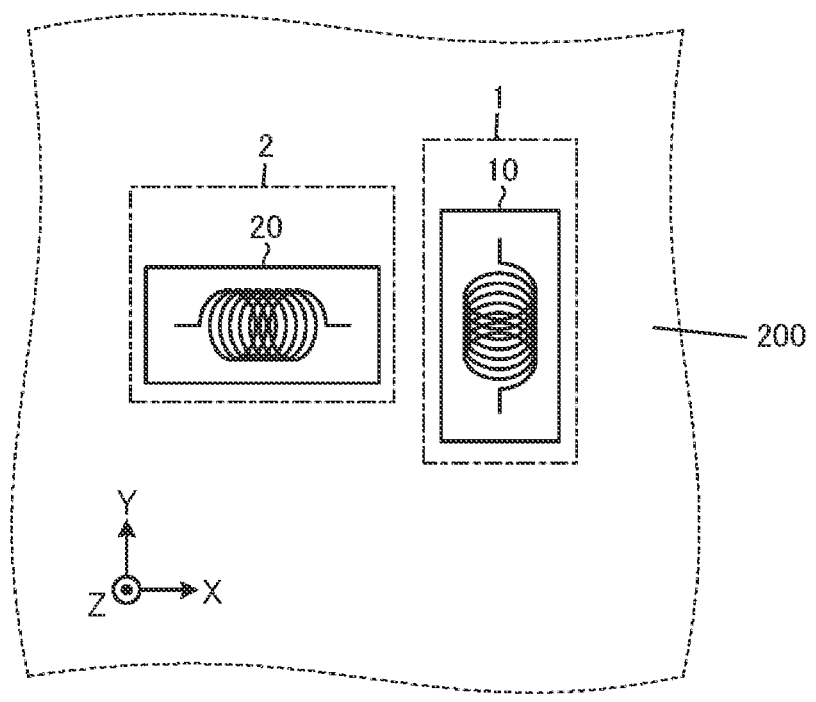
FIG. 4 is a diagram illustrating an example of an arrangement mode of a first inductor and a second inductor on the substrate according to the embodiment.
Figure 5:
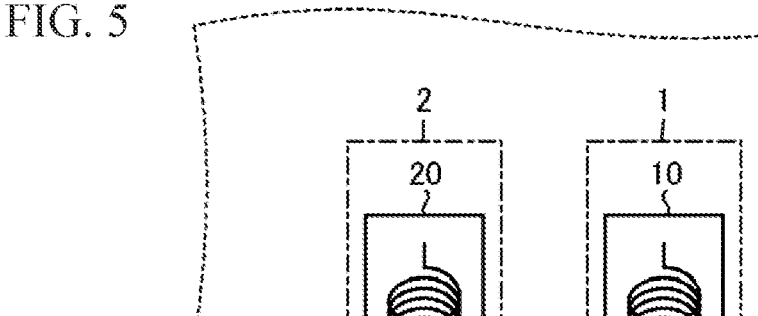
FIG. 5 is a diagram illustrating an example of the arrangement mode of the first inductor and the second inductor on the substrate according to a comparative example.

FIG. 4 is a diagram illustrating an example of an arrangement mode of the first inductor and the second inductor on the substrate according to the embodiment. FIG. 5 is a diagram illustrating an example of the arrangement mode of the first inductor and the second inductor on the substrate according to a comparative example. FIG. 4 and FIG. 5 illustrate an example in which the first inductor 10 of the first matching circuit 1 and the second inductor 20 of the second matching circuit 2 are disposed close to each other on the substrate 200 of the transmission and reception module 100.

In the arrangement mode according to the comparative example illustrated in FIG. 5, the winding axis direction of the first inductor 10 (the winding axis direction A illustrated in FIG. 3, hereinafter omitted) and the winding axis direction of the second inductor 20 substantially coincide with each other in a Y-axis direction. In such an arrangement, a mutual inductance component due to magnetic flux coupling may be generated between the first inductor 10 and the second inductor 20. In this case, there is a possibility that attenuation performance between the antenna terminal ANT and the reception signal output terminal RXout is degraded. In addition, there is a possibility that the transmission signal component input from the transmission signal input terminal TXin is superimposed on the second inductor 20 from the first inductor 10, and the isolation performance between the transmission signal input terminal TXin and the reception signal output terminal RXout is degraded.

On the other hand, in the arrangement mode according to the embodiment illustrated in FIG. 4, the winding axis direction of the first inductor 10 is the Y-axis direction, and the winding axis direction of the second inductor 20 is an X-axis direction. Thus, it is possible to suppress a mutual inductance component generated between the first inductor 10 having the winding axis direction in the Y-axis direction and the second inductor 20 having the winding axis direction in the X-axis direction.

In the present disclosure, as illustrated in FIG. 4, the winding axis direction of the first inductor 10 and the winding axis direction of the second inductor 20 are made to be different from each other. Thus, it is possible to suppress the mutual inductance component generated by magnetic flux coupling between the first inductor 10 and the second inductor 20. Accordingly, it is possible to effectively suppress degradation of the attenuation performance between the antenna terminal ANT and the reception signal output terminal RXout and degradation of the isolation performance between the transmission signal input terminal TXin and the reception signal output terminal RXout.

Note that the first inductor 10 and the second inductor 20 may be configured by an SMD, or may be configured by a substrate pattern (conductor) provided on the substrate 200 of the transmission and reception module 100. Hereinafter, an arrangement mode of the first inductor 10 and the second inductor 20 on the substrate 200, which is different from FIG. 4, will be described with reference to FIG. 6 to FIG. 10.

Figure 6:
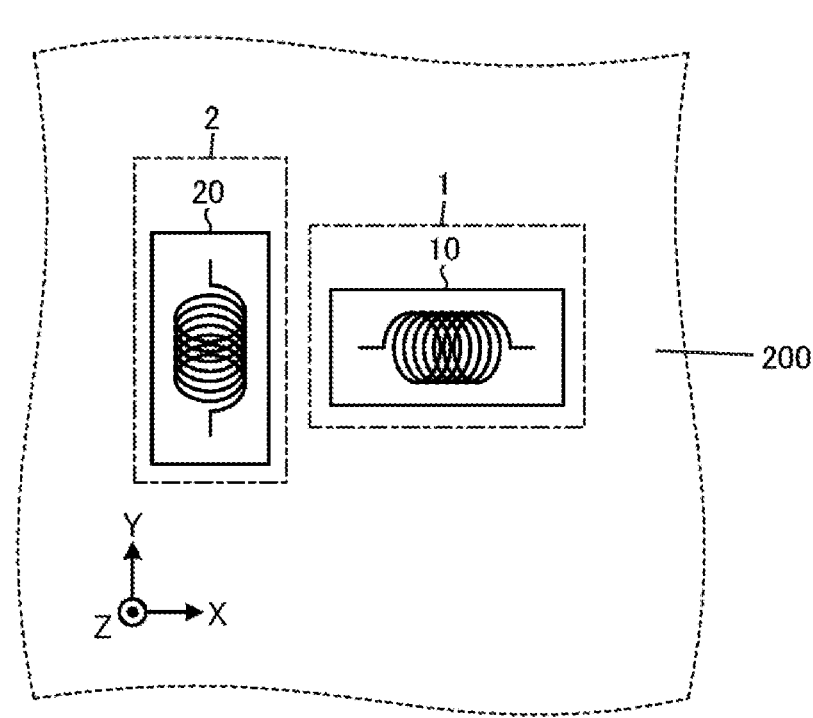
FIG. 6 is a diagram illustrating a first modification of the arrangement mode of the first inductor and the second inductor on the substrate according to the embodiment.

FIG. 6 is a diagram illustrating a first modification of the arrangement mode of the first inductor and the second inductor on the substrate according to the embodiment. In the arrangement mode illustrated in FIG. 6, the winding axis direction of the first inductor 10 is the X-axis direction, and the winding axis direction of the second inductor 20 is the Y-axis direction. The X-axis direction and a Y-axis direction are directions parallel to the substrate 200. Note that "parallel to the substrate 200" also includes a case of being substantially parallel to the substrate 200 (for example, a case of being deviated from a direction parallel to the substrate 200 due to manufacturing variation).

Figure 7:
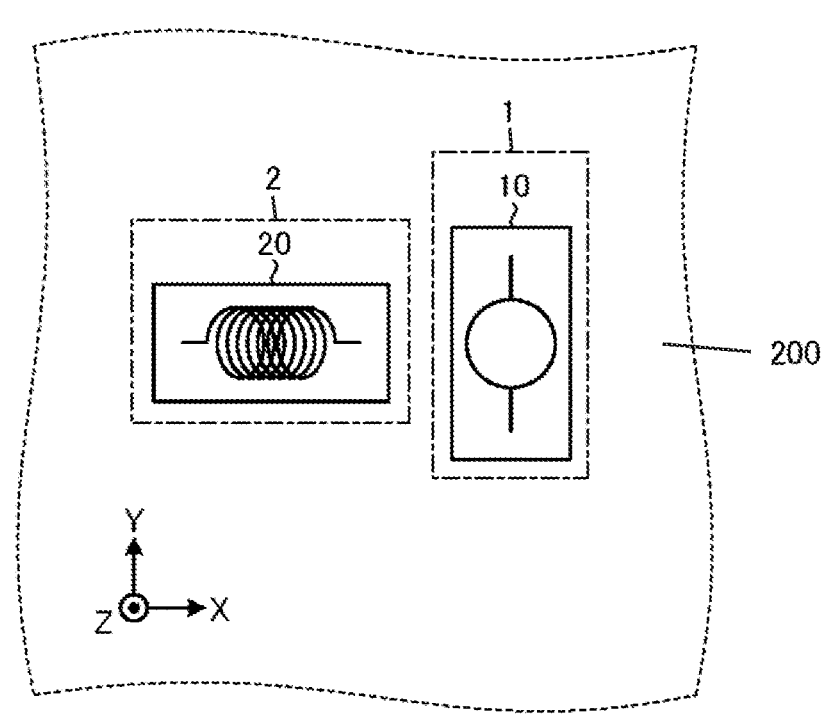
FIG. 7 is a diagram illustrating a second modification of the arrangement mode of the first inductor and the second inductor on the substrate according to the embodiment.

FIG. 7 is a diagram illustrating a second modification of the arrangement mode of the first inductor and the second inductor on the substrate according to the embodiment. In the arrangement mode illustrated in FIG. 7, the winding axis direction of the first inductor 10 is a Z-axis direction, and the winding axis direction of the second inductor 20 is the X-axis direction. The Z-axis direction is a direction orthogonal to the substrate 200. Note that "orthogonal to the substrate 200" also includes a case of being substantially orthogonal to the substrate 200 (for example, a case of being deviated from a direction orthogonal to the substrate 200 due to manufacturing variation).

Figure 8:
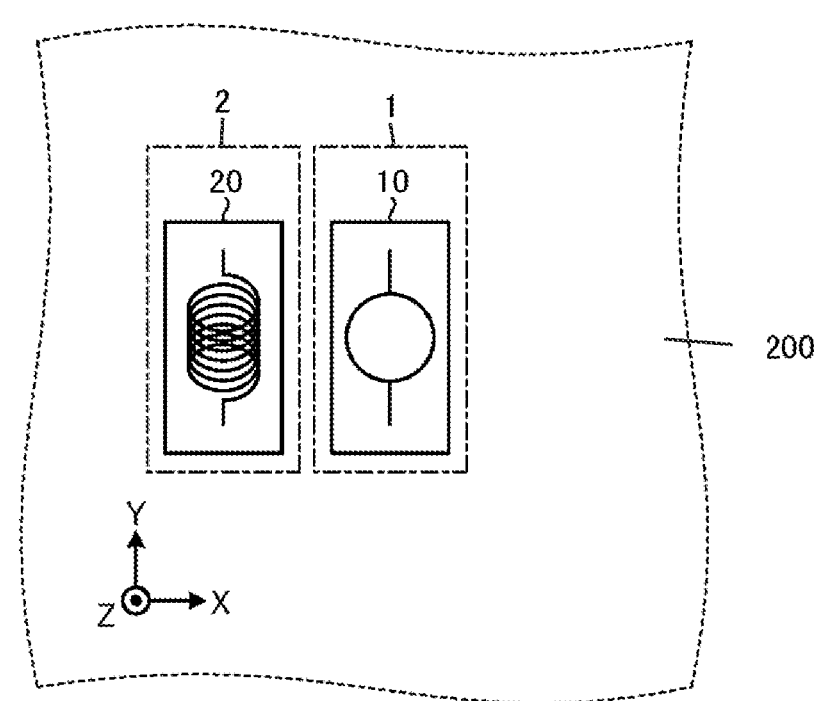
FIG. 8 is a diagram illustrating a third modification of the arrangement mode of the first inductor and the second inductor on the substrate according to the embodiment.

FIG. 8 is a diagram illustrating a third modification of the arrangement mode of the first inductor and the second inductor on the substrate according to the embodiment. In the arrangement mode illustrated in FIG. 8, the winding axis direction of the first inductor 10 is the Z-axis direction, and the winding axis direction of the second inductor 20 is the Y-axis direction.

Figure 9:
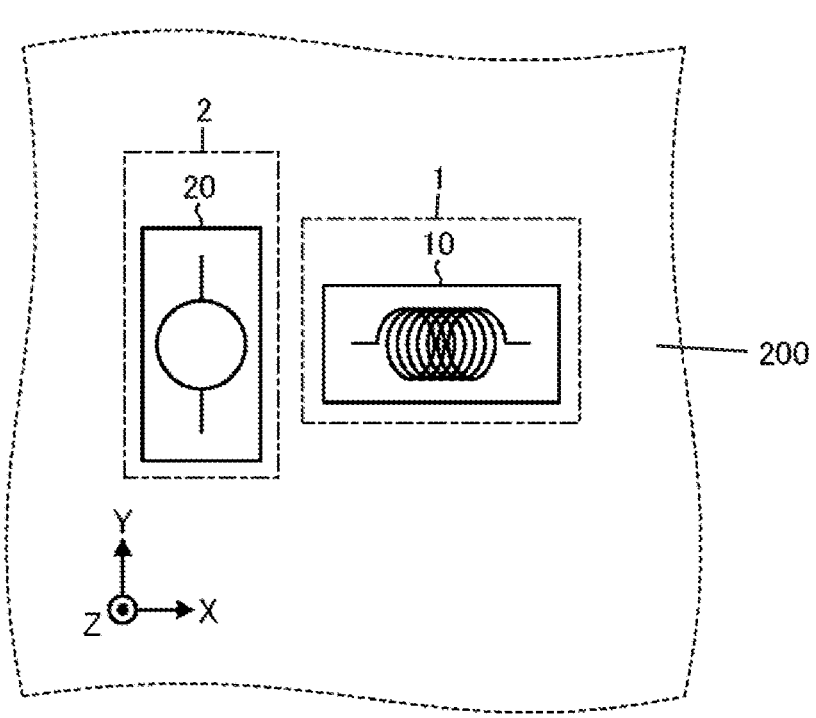
FIG. 9 is a diagram illustrating a fourth modification of the arrangement mode of the first inductor and the second inductor on the substrate according to the embodiment.

FIG. 9 is a diagram illustrating a fourth modification of the arrangement mode of the first inductor and the second inductor on the substrate according to the embodiment. In the arrangement mode illustrated in FIG. 9, the winding axis direction of the first inductor 10 is the X-axis direction, and the winding axis direction of the second inductor 20 is the Z-axis direction.

Figure 10:
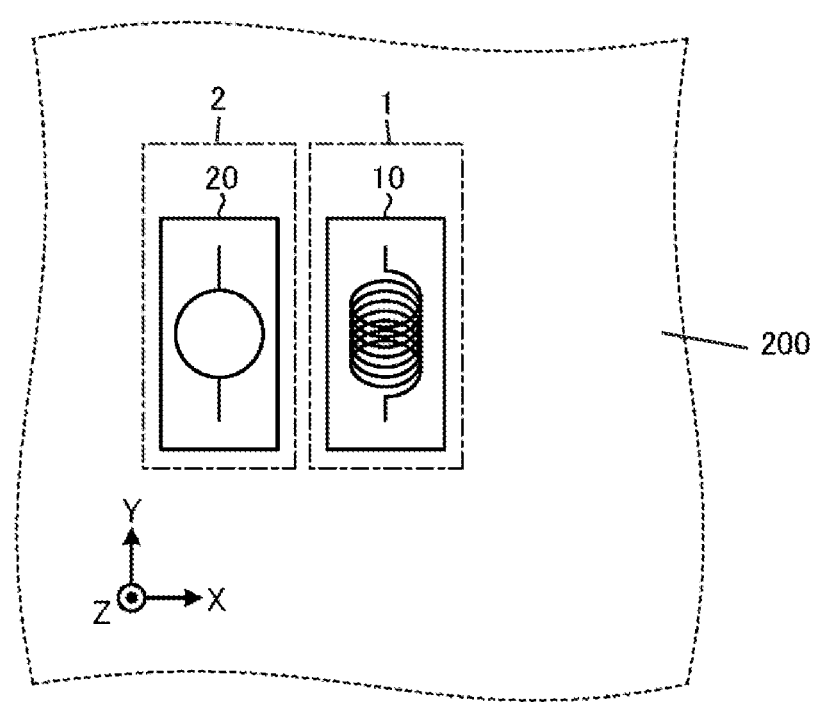
FIG. 10 is a diagram illustrating a fifth modification of the arrangement mode of the first inductor and the second inductor on the substrate according to the embodiment.

FIG. 10 is a diagram illustrating a fifth modification of the arrangement mode of the first inductor and the second inductor on the substrate according to the embodiment. In the arrangement mode illustrated in FIG. 10, the winding axis direction of the first inductor 10 is the Y-axis direction, and the winding axis direction of the second inductor 20 is the Z-axis direction.

Even in the arrangement modes illustrated in FIG. 6 to FIG. 10, the mutual inductance component generated by the magnetic flux coupling between the first inductor 10 and the second inductor 20 can be suppressed similarly to the arrangement mode illustrated in FIG. 4. Accordingly, it is possible to effectively suppress degradation of the attenuation performance between the antenna terminal ANT and the reception signal output terminal RXout and degradation of the isolation performance between the transmission signal input terminal TXin and the reception signal output terminal RXout.

Figure 11:
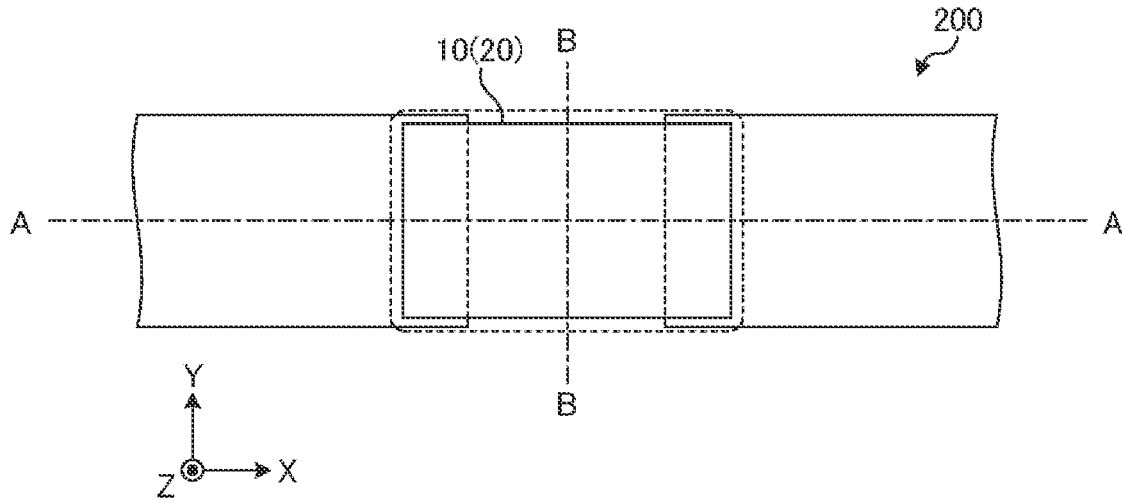
FIG. 11 is a top view illustrating a first example of a substrate layer configuration in a case where an inductor having a winding axis direction in a Z-axis direction is formed by an SMD.
Figure 12:
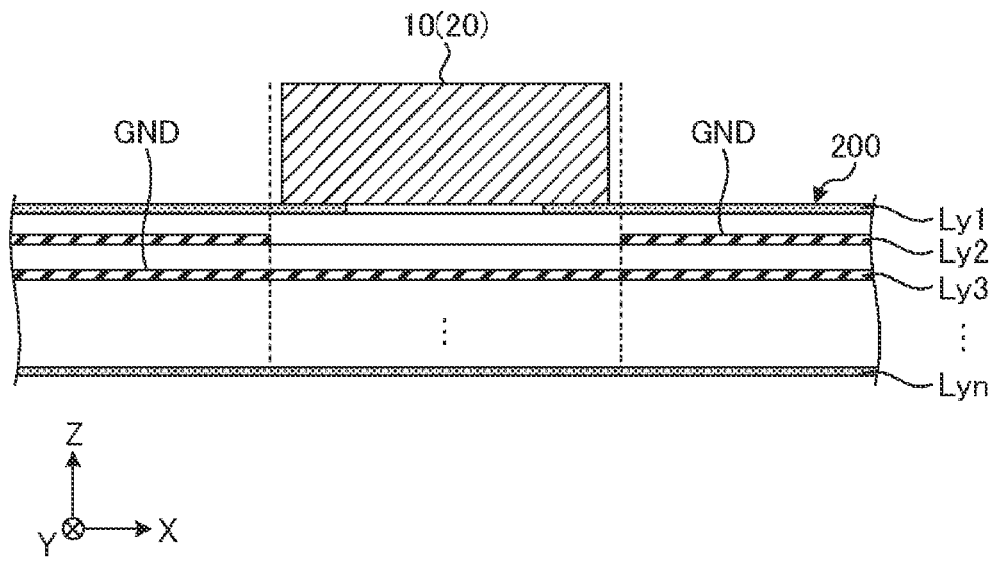
FIG. 12 is a cross-sectional view taken along a line A-A illustrated in FIG. 11.
Figure 13:
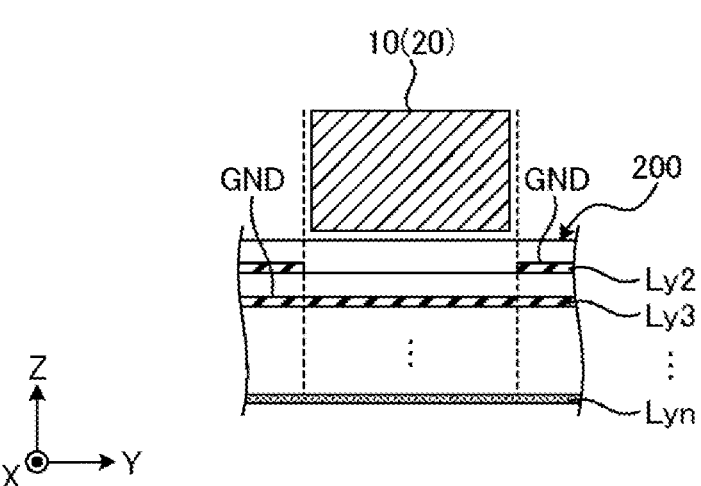
FIG. 13 is a cross-sectional view taken along a line B-B illustrated in FIG. 11.

FIG. 11 is a top view illustrating a first example of a substrate layer configuration in a case where an inductor having winding axis direction in the Z-axis direction is configured by an SMD. FIG. 12 is a cross-sectional view taken along a line A-A illustrated in FIG. 11. FIG. 13 is a cross-sectional view taken along a line B-B illustrated in FIG. 11.

Figure 14:
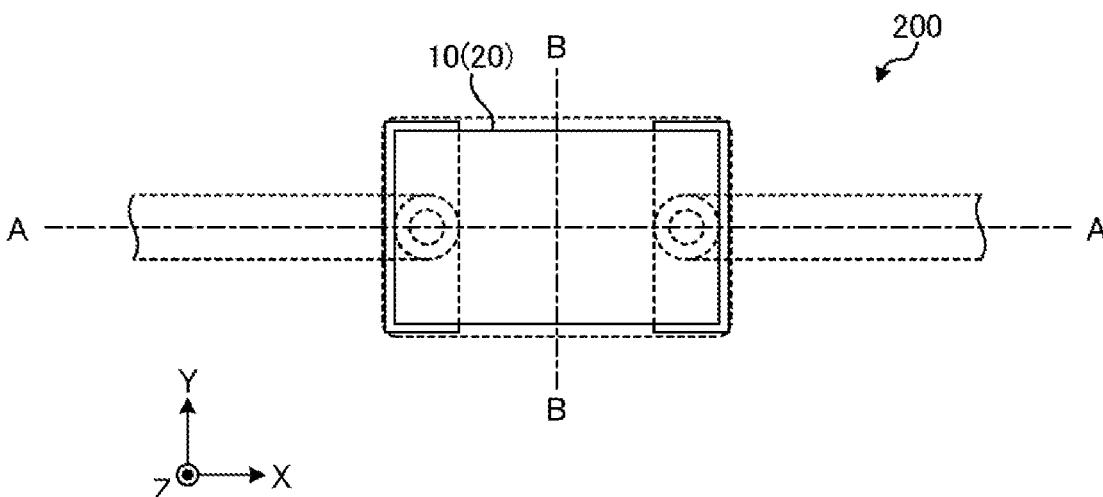
FIG. 14 is a top view illustrating a second example of the substrate layer configuration in a case where the inductor having a winding axis direction in the Z-axis direction is formed by an SMD.
Figure 15:
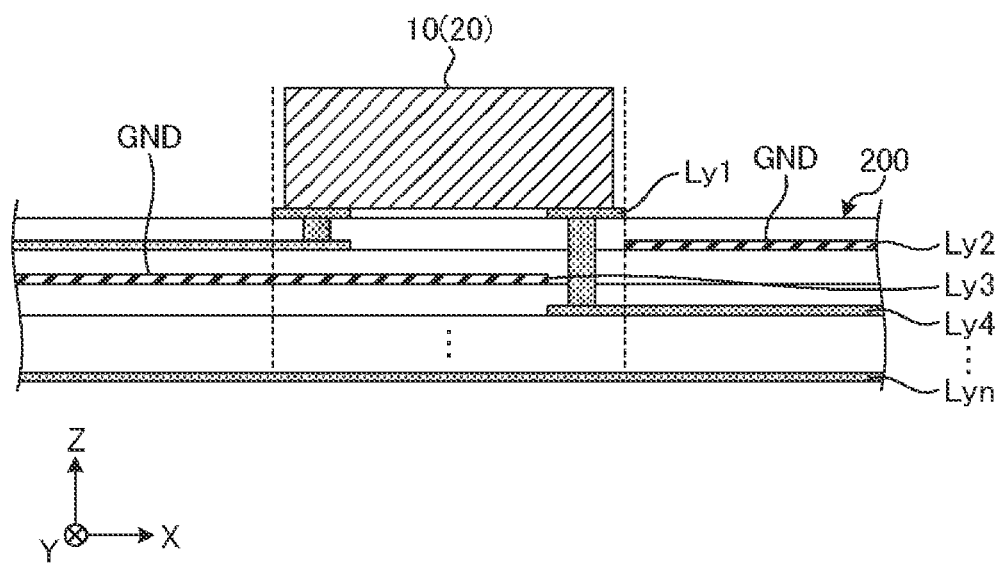
FIG. 15 is a cross-sectional view taken along a line A-A illustrated in FIG. 14.
Figure 16:
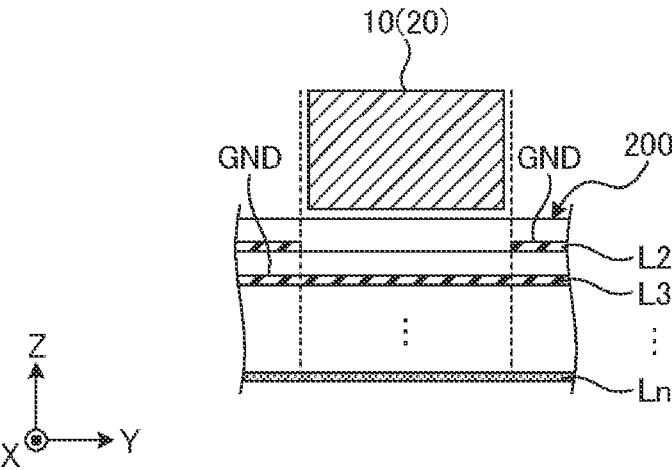
FIG. 16 is a cross-sectional view taken along a line B-B illustrated in FIG. 14.

FIG. 14 is a top view illustrating a second example of the substrate layer configuration in a case where the inductor having a winding axis direction in the Z-axis direction is formed by an SMD. FIG. 15 is a cross-sectional view taken along a line A-A illustrated in FIG. 14. FIG. 16 is a cross-sectional view taken along a line B-B illustrated in FIG. 14.

Figure 17:
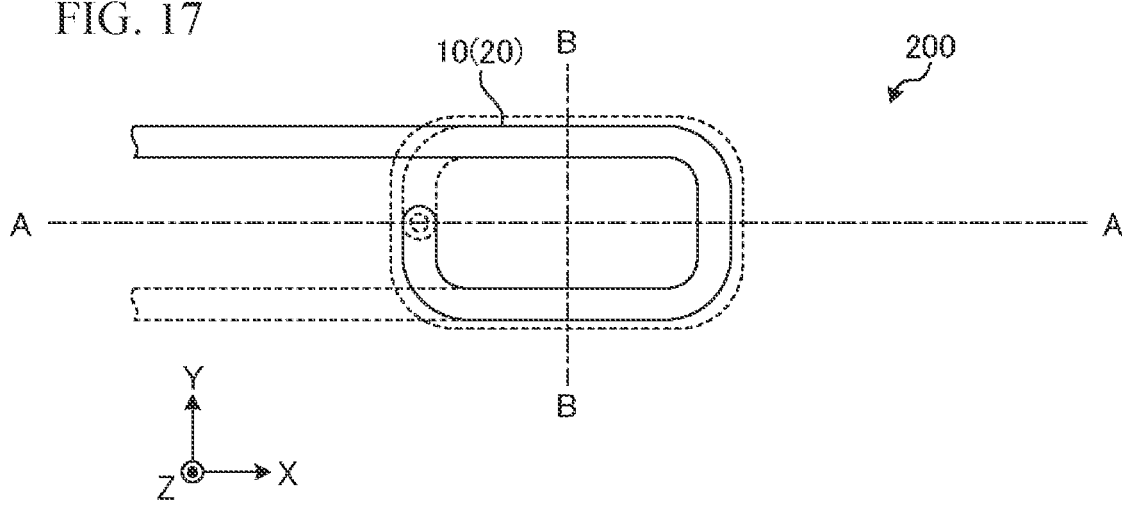
FIG. 17 is a top view illustrating an example of a substrate layer configuration in a case where the inductor having a winding axis direction in the Z-axis direction is formed by a conductor provided on the substrate.
Figure 18:
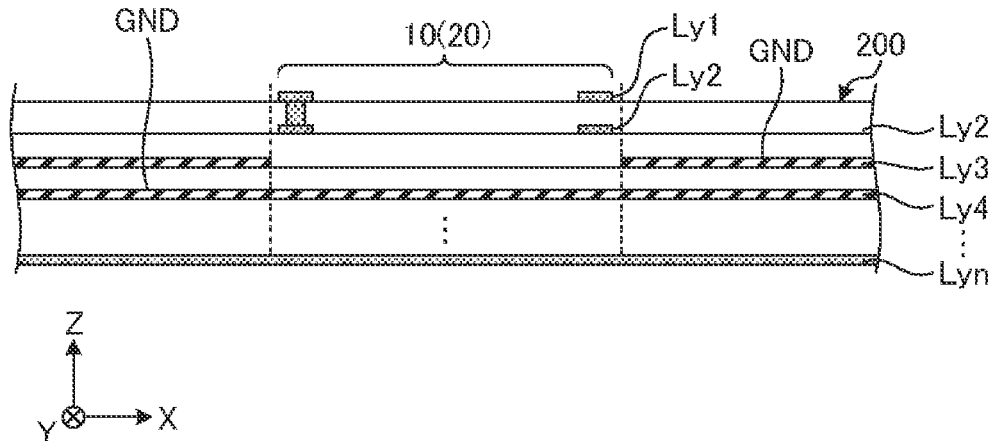
FIG. 18 is a cross-sectional view taken along a line A-A illustrated in FIG. 17.
Figure 19:
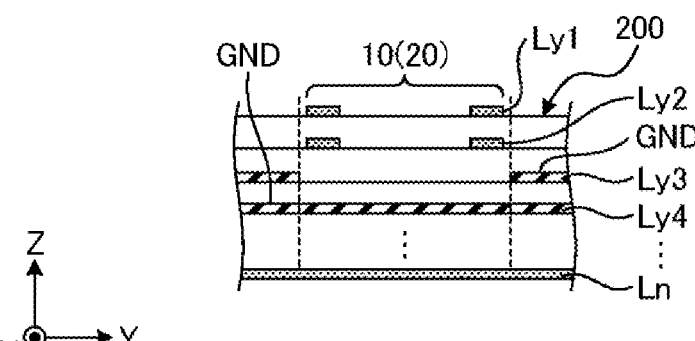
FIG. 19 is a cross-sectional view taken along a line B-B illustrated in FIG. 17.

FIG. 17 is a top view illustrating an example of the substrate layer configuration in a case where the inductor having a winding axis direction in the Z-axis direction is formed by a conductor provided on the substrate. FIG. 18 is a cross-sectional view taken along a line A-A illustrated in FIG. 17. FIG. 19 is a cross-sectional view taken along a line B-B illustrated in FIG. 17.

In the examples illustrated in FIG. 11 to FIG. 19, the substrate 200 is a multilayer substrate in which a plurality of wiring layers Ly1, Ly2, Ly3, . . . , and Lyn (n is a natural number) is laminated with an insulator layer interposed therebetween.

As illustrated in FIG. 11 to FIG. 16, when the first inductor 10 or the second inductor 20 is formed by the SMD, a wiring (GND wiring) connected to the ground potential is not provided in an area within broken lines, which overlaps the first inductor 10 or the second inductor 20, of the wiring layer Ly2 adjacent in the laminating direction to the wiring layer Ly1 to which the first inductor 10 is connected in a top view (a plan view viewed from a mounting surface side of the first inductor 10 of the substrate 200 along the laminating direction of the plurality wiring layers Ly1, Ly2, Ly3, . . . , Lyn). Note that as illustrated in FIG. 15, in the wiring layer Ly2 adjacent to the wiring layer Ly1 in the laminating direction, wirings other than the GND wiring (for example, wirings connected to input terminals and output terminals) may be provided.

In addition, as illustrated in FIG. 17 to FIG. 19, when the first inductor 10 or the second inductor 20 is formed by the conductor provided on the substrate 200, the GND wiring is not provided in an area within broken lines, which overlaps the first inductor 10 or the second inductor 20, of the wiring layer Ly3 adjacent in the laminating direction to the wiring layers Ly1 and Ly2 to which the first inductor 10 or the second inductor 20 is connected in a top view.

By being configured in this manner, it is possible to suppress a decrease in the Q value of the inductor.

Figure 20:
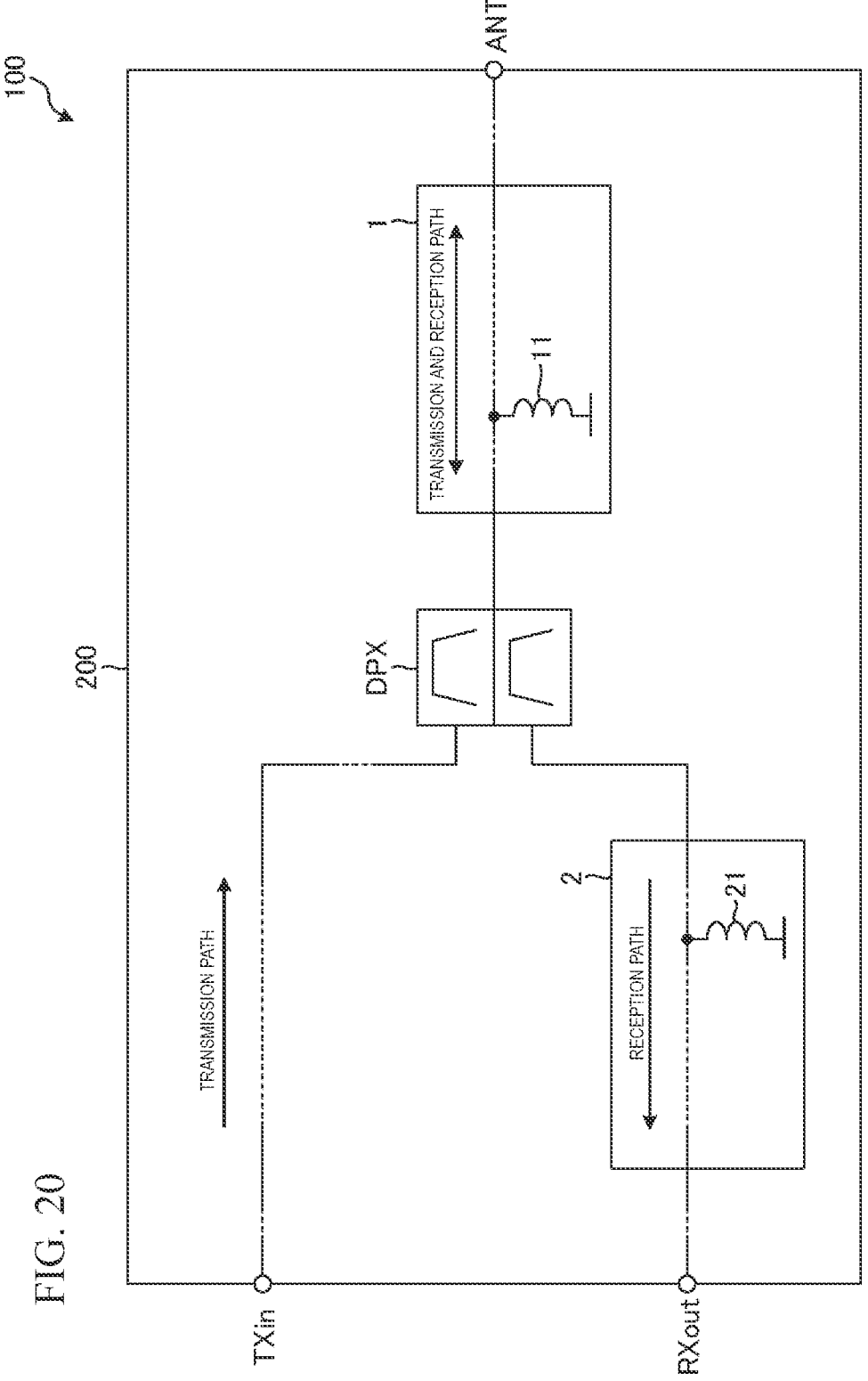
FIG. 20 is a first diagram illustrating a specific example of the configuration of the first inductor and the second inductor according to the embodiment.
Figure 21:
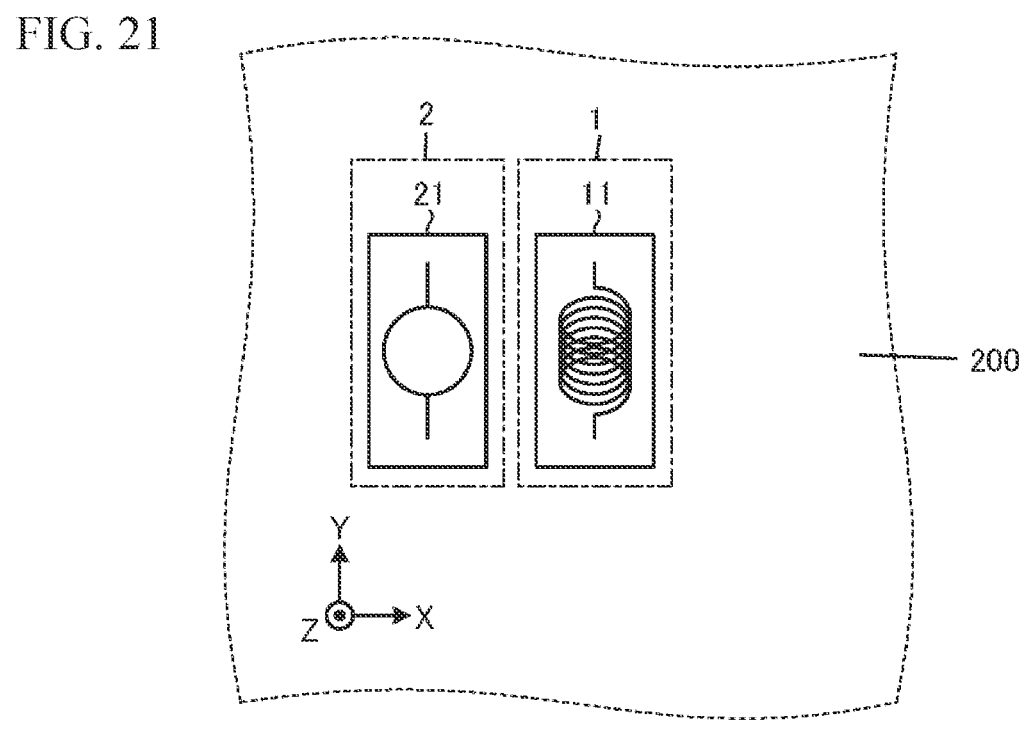

FIG. 20 is a first diagram illustrating a specific example of the configuration of the first inductor and the second inductor according to the embodiment. FIG. 21 is a diagram illustrating an example of the arrangement mode of the first inductor and the second inductor on the substrate in the specific example illustrated in FIG. 20.

FIG. 20 illustrates an example in which a first inductor 11 of the first matching circuit 1 is a shunt inductor inserted in series in a path connecting the transmission and reception path connecting the duplexer DPX and the antenna terminal ANT and the ground potential (GND), and a second inductor 21 of the second matching circuit 2 is a shunt inductor inserted in series in a path connecting the reception path connecting the duplexer DPA and the reception signal output terminal RXout and GND, but the first inductor 11 and the second inductor 21 may be one each or may have a plurality of inductors.

In such a configuration, as illustrated in FIG. 21, by making the winding axis direction of the first inductor 11 and the winding axis direction of the second inductor 21 different from each other, it is possible to suppress a mutual inductance component generated by magnetic flux coupling between the first inductor 11 and the second inductor 21. Accordingly, it is possible to effectively suppress degradation of the attenuation performance between the antenna terminal ANT and the reception signal output terminal RXout and degradation of the isolation performance between the transmission signal input terminal TXin and the reception signal output terminal RXout.

Note that although FIG. 21 illustrates an example in which the winding axis direction of the first inductor 11 is the Y-axis direction and the winding axis direction of the second inductor 21 is the Z-axis direction, the winding axis direction of the first inductor 11 and the winding axis direction of the second inductor 21 only need to be different from each other and are not limited to the example illustrated in FIG. 21. The winding axis direction of the first inductor 11 may be the Y-axis direction and the winding axis direction of the second inductor 21 may be the X-axis direction as illustrated in FIG. 4, the winding axis direction of the first inductor 11 may be the X-axis direction and the winding axis direction of the second inductor 21 may be the Y-axis direction as illustrated in FIG. 6, the winding axis direction of the first inductor 11 may be the Z-axis direction and the winding axis direction of the second inductor 21 may be the X-axis direction as illustrated in FIG. 7, the winding axis direction of the first inductor 11 may be the Z-axis direction and the winding axis direction of the second inductor 21 may be the Y-axis direction as illustrated in FIG. 8, and the winding axis direction of the first inductor 11 may be the X-axis direction and the winding axis direction of the second inductor 21 may be the Z-axis direction as illustrated in FIG. 9.

Figure 22:
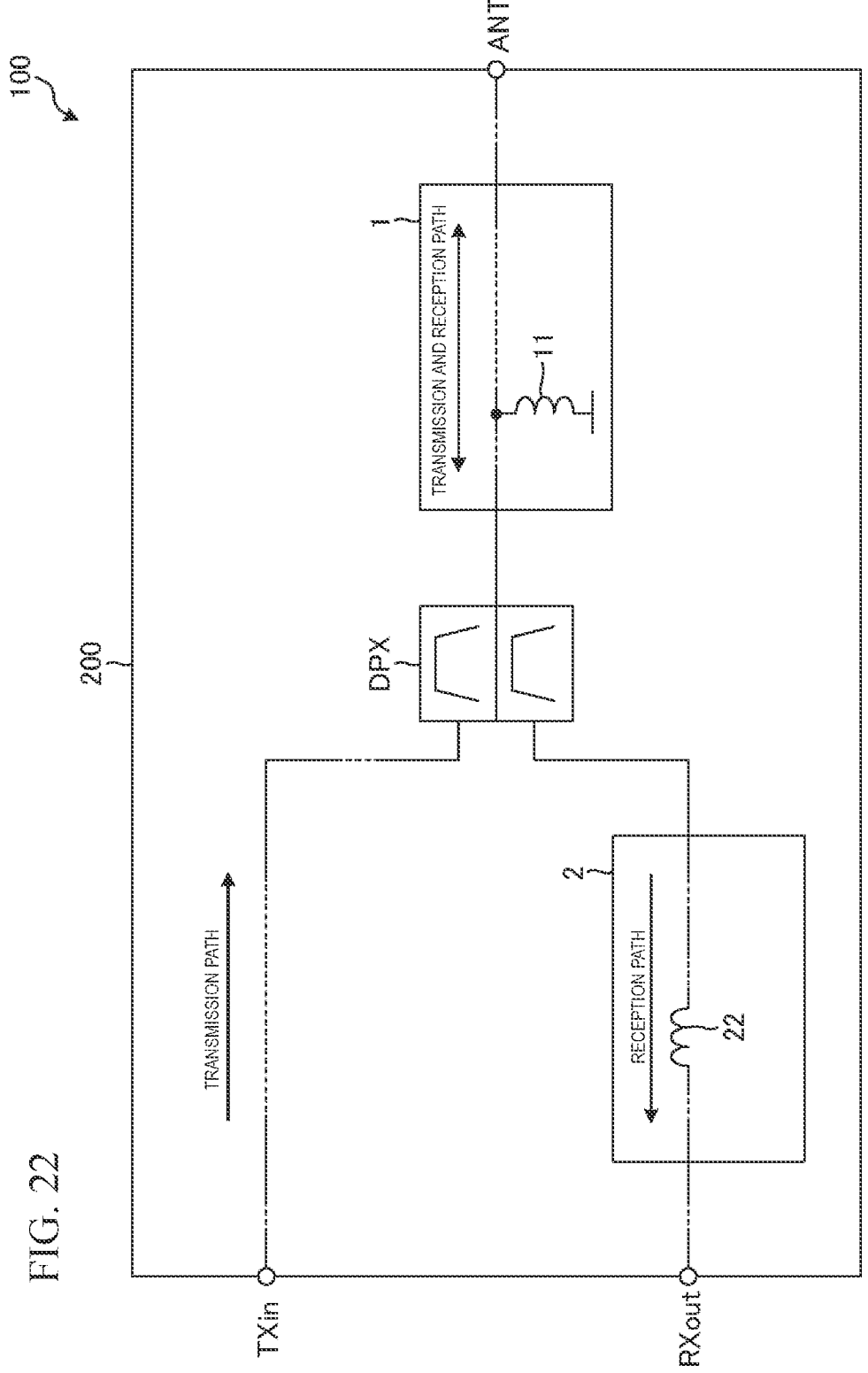
FIG. 22 is a second diagram illustrating a specific example of the configuration of the first inductor and the second inductor according to the embodiment.
Figure 23:
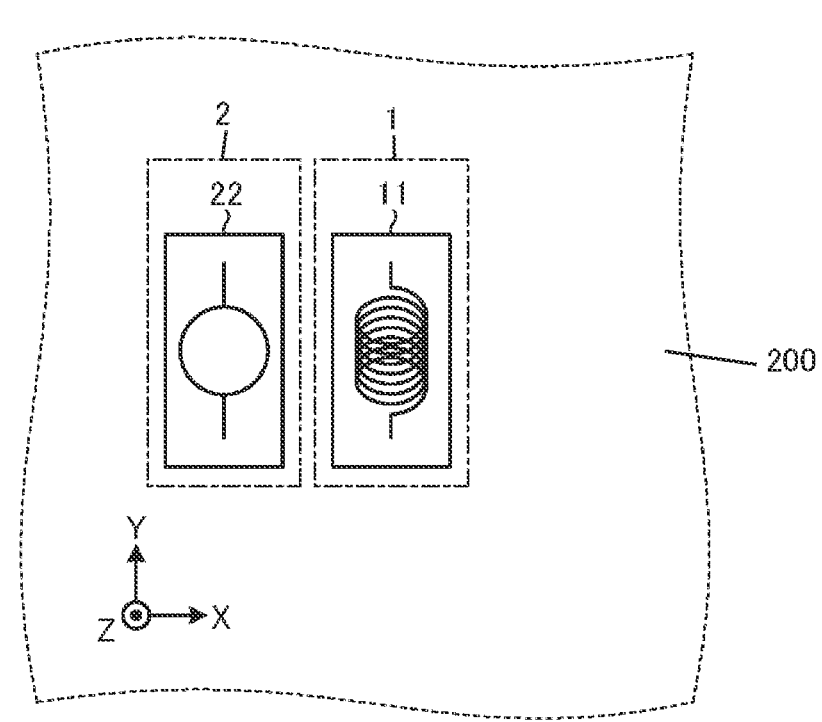
FIG. 23 is a diagram illustrating an example of the arrangement mode of the first inductor and the second inductor on the substrate in the specific example illustrated in FIG. 22.

FIG. 22 is a second diagram illustrating a specific example of the configuration of the first inductor and the second inductor according to the embodiment. FIG. 23 is a diagram illustrating an example of an arrangement mode of the first inductor and the second inductor on the substrate in the specific example illustrated in FIG. 22.

FIG. 22 illustrates an example in which the first inductor 11 of the first matching circuit 1 is a shunt inductor inserted in series in a path connecting the transmission and reception path connecting the duplexer DPX and the antenna terminal ANT and the GND, and a second inductor 22 of the second matching circuit 2 is a series inductor inserted in series in a reception path connecting the duplexer DPX and the reception signal output terminal RXout, but the first inductor 11 and the second inductor 22 may be one each or may have a plurality of inductors.

In such a configuration, as illustrated in FIG. 23, by making the winding axis direction of the first inductor 11 and the winding axis direction of the second inductor 22 different from each other, it is possible to suppress a mutual inductance component generated by magnetic flux coupling between the first inductor 11 and the second inductor 22. Accordingly, it is possible to effectively suppress degradation of the attenuation performance between the antenna terminal ANT and the reception signal output terminal RXout and degradation of the isolation performance between the transmission signal input terminal TXin and the reception signal output terminal RXout.

Note that although FIG. 23 illustrates an example in which the winding axis direction of the first inductor 11 is the Y-axis direction and the winding axis direction of the second inductor 22 is the Z-axis direction, the winding axis direction of the first inductor 11 and the winding axis direction of the second inductor 22 only need to be different from each other and are not limited to the example illustrated in FIG. 23. The winding axis direction of the first inductor 11 may be the Y-axis direction and the winding axis direction of the second inductor 22 may be the X-axis direction as illustrated in FIG. 4, the winding axis direction of the first inductor 11 may be the Z-axis direction and the winding axis direction of the second inductor 22 may be the X-axis direction as illustrated in FIG. 6, the winding axis direction of the first inductor 11 may be the Z-axis direction and winding axis direction of the second inductor 22 may be the X-axis direction as illustrated in FIG. 7, the winding axis direction of the first inductor 11 may be the Z-axis direction and the winding axis direction of the second inductor 22 may be the Y-axis direction as illustrated in FIG. 8, and the winding axis direction of the first inductor 11 may be the X-axis direction and the winding axis direction of the second inductor 22 may be the Z-axis direction as illustrated in FIG. 9.

FIG. 24 is a third diagram illustrating a specific example of the configuration of the first inductor and the second inductor according to the embodiment. FIG. 25 is a diagram illustrating an example of an arrangement mode of the first inductor and the second inductor on the substrate in the specific example illustrated in FIG. 24.

FIG. 24 illustrates an example in which a first inductor 12 of the first matching circuit 1 is a series inductor inserted in series in the transmission and reception path connecting the duplexer DPX and the antenna terminal ANT, and the second inductor 21 of the second matching circuit 2 is a shunt inductor inserted in series in the path connecting the reception path connecting the duplexer DPX and the reception signal output terminal RXout and the GND, but the first inductor 12 and the second inductor 21 may be one each or may have a plurality of inductors.

In such a configuration, as illustrated in FIG. 25, by making the winding axis direction of the first inductor 12 and the winding axis direction of the second inductor 21 different from each other, it is possible to suppress a mutual inductance component generated by magnetic flux coupling between the first inductor 12 and the second inductor 21. Accordingly, it is possible to effectively suppress degradation of the attenuation performance between the antenna terminal ANT and the reception signal output terminal RXout and degradation of the isolation performance between the transmission signal input terminal TXin and the reception signal output terminal RXout.

Note that although FIG. 25 illustrates an example in which the winding axis direction of the first inductor 12 is the Y-axis direction and the winding axis direction of the second inductor 21 is the Z-axis direction, the winding axis direction of the first inductor 12 and the winding axis direction of the second inductor 21 only need to be different from each other and are not limited to the example illustrated in FIG. 25. The winding axis direction of the first inductor 12 may be the Y-axis direction and the winding axis direction of the second inductor 21 may be the X-axis direction as illustrated in FIG. 4, the winding axis direction of the first inductor 12 may be the Z-axis direction and the winding axis direction of the second inductor 21 may be the X-axis direction as illustrated in FIG. 6, the winding axis direction of the first inductor 12 may be the Z-axis direction and the winding axis direction of the second inductor 21 may be the X-axis direction as illustrated in FIG. 7, the winding axis direction of the first inductor 12 may be the Z-axis direction and the winding axis direction of the second inductor 21 may be the Y-axis direction as illustrated in FIG. 8, and the winding axis direction of the first inductor 12 may be the X-axis direction and the winding axis direction of the second inductor 21 may be the Z-axis direction as illustrated in FIG. 9.

Further, as illustrated in FIG. 22 to FIG. 25, the first inductor 12 or the second inductor 22 may be a series inductor inserted in series in the transmission and reception path connecting the duplexer DPX and the antenna terminal ANT, or a series inductor inserted in series in the reception path connecting the duplexer DPX and the reception signal output terminal RXout. The series inductor is an inductor serving as a path for a reception signal passing between the reception signal output terminal RXout and the antenna terminal ANT. Therefore, the intensity of a signal passing through the series inductor is likely to be higher than the intensity of a signal passing through the shunt inductor that does not serve as a path for a reception signal passing between the reception signal output terminal RXout and the antenna terminal ANT. In a case where one of the first inductor and the second inductor is a series inductor, degradation of the isolation performance due to magnetic coupling between the series inductor and another inductor is likely to occur. Therefore, the present disclosure in which the degradation of the isolation performance is suppressed can be more effectively applied by making the winding axis directions different.

Furthermore, as illustrated in FIG. 23, the winding axis direction of the conductor of the inductor that is the series inductor of the first inductor and the second inductor may be the Z-axis direction. The inductor in which the winding axis direction of the conductor is the Z-axis direction is more likely to suppress a mutual inductance component generated by magnetic coupling with another inductor than the inductor in which the winding axis direction of the conductor is the X-axis direction or the Y-axis direction. Therefore, by applying the inductor having the winding axis direction in the Z-axis direction to the series inductor in which the degradation of the isolation performance is likely to occur, the present disclosure that suppresses the degradation of the isolation performance can be more effectively applied.

FIG. 26 is a fourth diagram illustrating a specific example of the configuration of the first inductor and the second inductor according to the embodiment. FIG. 27 is a diagram illustrating an example of an arrangement mode of the first inductor and the second inductor on the substrate in the specific example illustrated in FIG. 26.

FIG. 26 illustrates an example in which the first inductor 12 of the first matching circuit 1 is a series inductor inserted in series in the transmission and reception path connecting the duplexer DPX and the antenna terminal ANT, and the second inductor 22 of the second matching circuit 2 is a series inductor inserted in series in the reception path connecting the duplexer DPX and the reception signal output terminal RXout, but the first inductor 12 and the second inductor 22 may be one each or may have a plurality of inductors.

In such a configuration, as illustrated in FIG. 27, by making the winding axis direction of the first inductor 12 and the winding axis direction of the second inductor 22 different from each other, it is possible to suppress a mutual inductance component generated by magnetic flux coupling between the first inductor 12 and the second inductor 22. Accordingly, it is possible to effectively suppress degradation of the attenuation performance between the antenna terminal ANT and the reception signal output terminal RXout and degradation of the isolation performance between the transmission signal input terminal TXin and the reception signal output terminal RXout.

Note that although FIG. 27 illustrates an example in which the winding axis direction of the first inductor 12 is the Y-axis direction and the winding axis direction of the second inductor 22 is the Z-axis direction, the winding axis direction of the first inductor 12 and the winding axis direction of the second inductor 22 only need to be different from each other and are not limited to the example illustrated in FIG. 27. The winding axis direction of the first inductor 12 may be the Y-axis direction and the winding axis direction of the second inductor 22 may be the X-axis direction as illustrated in FIG. 4, the winding axis direction of the first inductor 12 may be the Z-axis direction and the winding axis direction of the second inductor 22 may be the X-axis direction as illustrated in FIG. 6, the winding axis direction of the first inductor 12 may be the Z-axis direction and the winding axis direction of the second inductor 22 may be the X-axis direction as illustrated in FIG. 7, the winding axis direction of the first inductor 12 may be the Z-axis direction and the winding axis direction of the second inductor 22 may be the Y-axis direction as illustrated in FIG. 8, and the winding axis direction of the first inductor 12 may be the X-axis direction and the winding axis direction of the second inductor 22 may be the Z-axis direction as illustrated in FIG. 9.

Further, as illustrated in FIG. 26 and FIG. 27, the first inductor 12 and the second inductor 22 may be a series inductor inserted in series in the transmission and reception path connecting the duplexer DPX and the antenna terminal ANT, and a series inductor inserted in series in the reception path connecting the duplexer DPX and the reception signal output terminal RXout, respectively. The intensity of a signal passing through the series inductor is likely to be higher than the intensity of a signal passing through the shunt inductor that does not serve as a path for a reception signal passing between the reception signal output terminal RXout and the antenna terminal ANT. Therefore, in a case where the first inductor and the second inductor are series inductors, the isolation performance due to the magnetic coupling between the series inductors is more likely to be significantly degraded. Therefore, the present disclosure in which the degradation of the isolation performance is suppressed can be more effectively applied by making the winding axis directions different.

Furthermore, as illustrated in FIG. 27, the winding axis direction of the conductor of any one of the first inductor and the second inductor may be the Z-axis direction. The inductor in which the winding axis direction of the conductor is the Z-axis direction is more likely to suppress a mutual inductance component generated by magnetic coupling with another inductor than the inductor in which the winding axis direction of the conductor is the X-axis direction or the Y-axis direction. Therefore, by applying the inductor having the winding axis direction in the Z-axis direction to the series inductor in which the degradation of the isolation performance is likely to occur, the present disclosure that suppresses the degradation of the isolation performance can be more effectively applied.

FIG. 28 is a fifth diagram illustrating a specific example of the configuration of the first inductor and the second inductor according to the embodiment. FIG. 29 is a diagram illustrating an example of an arrangement mode of the first inductor and the second inductor on the substrate in the specific example illustrated in FIG. 28.

FIG. 28 illustrates an example in which the first inductors 11 and 12 of the first matching circuit 1 include a shunt inductor inserted in series in the path connecting the transmission and reception path connecting the duplexer DPX and the antenna terminal ANT and the GND, and a series inductor inserted in series in the transmission and reception path connecting the duplexer DPX and the antenna terminal ANT, and the second inductors 21 and 22 of the second matching circuit 2 include a shunt inductor inserted in series in the path connecting the reception path connecting the duplexer DPX and the reception signal output terminal RXout and the GND, and a series inductor inserted in series in the reception path connecting the duplexer DPX and the reception signal output terminal RXout, but the first inductors 11 and 12 and the second inductors 21 and 22 may be one each or may have a plurality of inductors. Alternatively, the first matching circuit 1 may include any one of the shunt inductor (first inductor 11) and the series inductor (first inductor 12), and the second matching circuit 2 may include any one of the shunt inductor (second inductor 21) and the series inductor (second inductor 22).

In such a configuration, as illustrated in FIG. 29, by making the winding axis direction of the first inductors 11 and 12 and the winding axis direction of the second inductors 21 and 22 different from each other, it is possible to suppress a mutual inductance component generated by magnetic flux coupling between the first inductors 11 and 12 and the second inductors 21 and 22. Accordingly, it is possible to effectively suppress degradation of the attenuation performance between the antenna terminal ANT and the reception signal output terminal RXout and degradation of the isolation performance between the transmission signal input terminal TXin and the reception signal output terminal RXout.

Note that although FIG. 29 illustrates an example in which the winding axis direction of the first inductors 11 and 12 is the Y-axis direction and the winding axis direction of the second inductors 21 and 22 is the Z-axis direction, the winding axis direction of the first inductors 11 and 12 and the winding axis direction of the second inductors 21 and 22 only need to be different from each other and are not limited to the example illustrated in FIG. 29. The winding axis direction of the first inductors 11 and 12 may be the Y-axis direction and the winding axis direction of the second inductors 21 and 22 may be the X-axis direction as illustrated in FIG. 4, the winding axis direction of the first inductors 11 and 12 may be the Z-axis direction and the winding axis direction of the second inductors 21 and 22 may be the X-axis direction as illustrated in FIG. 6, the winding axis direction of the first inductors 11 and 12 may be the Z-axis direction and the winding axis direction of the second inductors 21 and 22 may be the X-axis direction as illustrated in FIG. 7, the winding axis direction of the first inductors 11 and 12 may be the Z-axis direction and the winding axis direction of second inductors 21 and 22 may be the Y-axis direction as illustrated in FIG. 8, and the winding axis direction of the first inductors 11 and 12 may be the X-axis direction and the winding axis direction of the second inductors 21 and 22 may be the Z-axis direction as illustrated in FIG. 9. Further, the winding axis direction of the first inductor 11 and the winding axis direction of the first inductor 12 may be different from each other, and the winding axis direction of the second inductor 21 and the winding axis direction of the second inductor 22 may be different from each other.

Note that in the present disclosure, the winding axis directions of the first inductor 10, the second inductor 20, and the third inductor 30 are not limited to the examples illustrated in the above-described drawings. The winding axis directions of the first inductor 10, the second inductor 20, and the third inductor 30 need not be the X-axis direction, the Y-axis direction, or the Z-axis direction, respectively. Furthermore, for example, depending on the arrangement of the first matching circuit 1, the second matching circuit 2, and the third matching circuit 3 on the substrate 200, the winding axis directions of parts of the first inductor 10, the second inductor 20, and the third inductor 30 may substantially coincide with each other. Even in this case, for example, when the first inductor 10 and the second inductor 20 are disposed at positions on the substrate 200 where the mutual inductance component is likely to be generated, the mutual inductance component generated between the first inductor 10 and the second inductor 20 can be suppressed by making the winding axis directions of the first inductor 10 and the second inductor 20 different from each other.

FIG. 30 is a diagram illustrating a specific example of the configuration of the first inductor, the second inductor, and the third inductor according to the embodiment. FIG. 31 is a first diagram illustrating an example of an arrangement mode of the first inductor, the second inductor, and the third inductor on the substrate in the specific example illustrated in FIG. 30. FIG. 32 is a second diagram illustrating an example of the arrangement mode of the first inductor, the second inductor, and the third inductor on the substrate in the specific example illustrated in FIG. 30.

In FIG. 30, the first inductors 11 and 12 of the first matching circuit 1 include a shunt inductor inserted in series in the path connecting the transmission and reception path connecting the duplexer DPX and the antenna terminal ANT and the GND, and a series inductor inserted in series in the transmission and reception path connecting the duplexer DPX and the antenna terminal ANT. The second inductors 21 and 22 of the second matching circuit 2 include a shunt inductor inserted in series in the path connecting the reception path connecting the duplexer DPX and the reception signal output terminal RXout and the GND, and a series inductor inserted in series in the reception path connecting the duplexer DPX and the reception signal output terminal RXout. Further, third inductors 31 and 32 of the third matching circuit 3 include a shunt inductor inserted in series in the path connecting the transmission path connecting the duplexer DPX and the transmission signal input terminal TXin and the GND, and a series inductor inserted in series in the transmission path connecting the duplexer DPX and the transmission signal output terminal TXout, but the first inductors 11 and 12, the second inductors 21 and 22, and the third inductors 31 and 32 may be one each or may have a plurality of inductors. Alternatively, the first matching circuit 1 may include one of the shunt inductor (first inductor 11) and the series inductor (first inductor 12), the second matching circuit 2 may include one of the shunt inductor (second inductor 21) and the series inductor (second inductor 22), or the third matching circuit 3 may include one of the shunt inductor (third inductor 31) and the series inductor (third inductor 32).

In such a configuration, as illustrated in FIG. 31, by making the winding axis direction of the first inductors 11 and 12, the winding axis direction of the second inductors 21 and 22, and the winding axis direction of the third inductors 31 and 32 different from each other, it is possible to suppress magnetic flux coupling between the first inductors 11 and 12 and the second inductors 21 and 22, magnetic flux coupling between the first inductors 11 and 12 and the third inductors 31 and 32, and mutual inductance components generated by the second inductors 21 and 22 and the third inductors 31 and 32. Accordingly, it is possible to more effectively suppress degradation of the attenuation performance between the antenna terminal ANT and the reception signal output terminal RXout and degradation of the isolation performance between the transmission signal input terminal TXin and the reception signal output terminal RXout.

Note that although FIG. 31 illustrates an example in which the winding axis direction of the first inductors 11 and 12 is the Y-axis direction, the winding axis direction of the second inductors 21 and 22 is the Z-axis direction, and the winding axis direction of the third inductors 31 and 32 is the X-axis direction, the winding axis directions of the first inductors 11 and 12, the second inductors 21 and 22, and the third inductors 31 and 32 only need to be different from each other, and are not limited to the example illustrated in FIG. 31. Further, the winding axis direction of the first inductor 11 and the winding axis direction of the first inductor 12 may be different from each other, the winding axis direction of the second inductor 21 and the winding axis direction of the second inductor 22 may be different from each other, and the winding axis direction of the third inductor 31 and the winding axis direction of the third inductor 32 may be different from each other.

In the configuration illustrated in FIG. 30, for example, when the second inductors 21 and 22 and the third inductors 31 and 21 are disposed apart from each other compared to a distance between the first inductors 11 and 12 and the second inductors 21 and 22 and a distance between the first inductors 11 and 12 and the third inductors 31 and 32, the winding axis direction of the second inductors 21 and 22 and the winding axis direction of the third inductors 31 and 32 may substantially coincide with each other as illustrated in FIG. 32. Here, the first inductor 11 of the first inductors 11 and 12, the second inductor 21 of the second inductors 21 and 22, and the third inductor 31 of the third inductors 31 and 32 are all series inductors. Since the series inductor is more susceptible to magnetic coupling with another inductor than the shunt inductor as described above, the present disclosure can be applied more effectively when the winding axis direction of the conductor of at least one of the first inductor 11, the second inductor 21, and the third inductor 31 is set to the Z-axis direction. Note that although the winding axis directions of both the second inductor 21 and the third inductor 31 are the Z-axis direction in FIG. 32, the winding axis direction of either one of the second inductor 21 and the third inductor 31 or the winding axis direction of the first inductor 11 may be the Z-axis direction.

In addition, although FIG. 32 illustrates an example in which the winding axis direction of the first inductors 11 and 12 and the second inductors 21 and 22 is the Z-axis direction and the winding axis direction of the third inductors 31 and 32 is the X-axis direction, the winding axis directions of the first inductors 11 and 12 and the second inductors 21 and 22 only need to be different from the winding axis direction of the third inductors 31 and 32, and are not limited to the example illustrated in FIG. 32.

FIG. 33 is a diagram illustrating a specific example of the configuration of the first inductor and the second inductor for explaining the effect of the inductor arrangement according to the embodiment. FIG. 34 is a diagram illustrating an example of simulation results of attenuation performance between the antenna terminal and the reception signal output terminal in the configuration illustrated in FIG. 33. FIG. 35 is a diagram illustrating an example of simulation results of isolation performance between the transmission signal input terminal and the reception signal output terminal in the configuration illustrated in FIG. 33.

FIG. 33 illustrates an example in which the first inductor 11 of the first matching circuit 1 includes a shunt inductor inserted in series in the path connecting the transmission and reception path connecting the duplexer DPA and the antenna terminal ANT and the GND, and the second inductors 21 and 22 of the second matching circuit 2 include a shunt inductor inserted in series in the path connecting the reception path connecting the duplexer DPA and the reception signal output terminal RXout and the GND, and a series inductor inserted in series in the reception path.

In FIG. 34 and FIG. 35, broken lines indicate simulation results when the winding axis direction of the first inductor 11 of the first matching circuit 1 and the winding axis direction of the second inductors 21 and 22 of the second matching circuit 2 substantially coincide with each other, and solid lines indicate simulation results when the winding axis direction of the first inductor 11 of the first matching circuit 1 and the winding axis direction of the second inductors 21 and 22 of the second matching circuit 2 are different from each other.

In a case where the winding axis direction of the first inductor 11 of the first matching circuit 1 and the winding axis direction of the second inductors 21 and 22 of the second matching circuit 2 are different from each other, a mutual inductance component generated between the first inductor 11 of the first matching circuit 1 and the second inductors 21 and 22 of the second matching circuit 2 is suppressed as compared with a case where the winding axis direction of the first inductor 11 of the first matching circuit 1 and the winding axis direction of the second inductors 21 and 22 of the second matching circuit 2 substantially coincide with each other. Thus, as illustrated in FIG. 34, the disturbance wave component (transmission signal component) in the outer side portion of the reception wave band is suppressed. As a result, it is possible to suppress degradation of the attenuation performance between the antenna terminal ANT and the reception signal output terminal RXout.

Further, as illustrated in FIG. 35, the transmission signal component superimposed from the first inductor 11 to the second inductors 21 and 22 is suppressed. As a result, it is possible to suppress degradation of the isolation performance between the transmission signal input terminal TXin and the reception signal output terminal RXout.

Note that the above-described embodiment describes the configuration in which the second inductor 21 or 22 included in the second matching circuit 2 is always provided in the path on the reception signal output terminal RXout side of the duplexer DPX, but the embodiment of the present disclosure is not limited thereto. For example, the configuration may be such that the second inductor 21 or 22 included in the second matching circuit 2 is not provided, and the third inductor 31 or 32 included in the third matching circuit 3 provided in the path on the transmission signal input terminal TXin side of the duplexer DPX is provided instead. In this case, when the winding axis direction of the conductor of the third inductor 31 or 32 is different from the winding axis direction of the conductor of the first inductor 11 or 12 included in the first matching circuit 1 provided in the path on the antenna terminal ANT side of the duplexer DPX, degradation of the attenuation performance between the antenna terminal ANT and the transmission signal input terminal TXin can be suppressed.

Note that the above-described embodiment is intended to facilitate understanding of the present disclosure, and is not intended to limit the present disclosure. The present disclosure may be changed/improved without necessarily departing from the gist thereof, and equivalents thereof are also included in the present disclosure.

The present disclosure may take the following configurations as described above or instead of the above.

(1) A transmission and reception module according to an aspect of the present disclosure includes: a substrate including a transmission signal input terminal, a reception signal output terminal, and an antenna terminal; a duplexer that is provided on the substrate, outputs a transmission signal input from the transmission signal input terminal to the antenna terminal, and outputs a reception signal input from the antenna terminal to the reception signal output terminal; a first inductor included in a first matching circuit provided between the duplexer and the antenna terminal; and a second inductor included in a second matching circuit provided between the duplexer and the reception signal output terminal, in which on the substrate, a winding axis direction of a conductor of the first inductor and a winding axis direction of a conductor of the second inductor are different from each other.

(2) The transmission and reception module of (1) described above, further includes an antenna switch circuit provided between the duplexer and the antenna terminal, in which the first matching circuit is provided between the duplexer and the antenna switch circuit.

(3) The transmission and reception module of (1) or (2) described above, further includes a low-noise amplifier circuit provided between the duplexer and the reception signal output terminal,
  in which the second matching circuit is provided between the duplexer and the low-noise amplifier circuit.

(4) In the transmission and reception module of (1) to (3) described above, a winding axis direction of a conductor of the first inductor or a winding axis direction of a conductor of the second inductor is orthogonal to the substrate.

(5) In the transmission and reception module of (1) to (4) described above, the first inductor is inserted in series in a path connecting the duplexer and the antenna terminal, and the second inductor is inserted in series in a path connecting the duplexer and the reception signal output terminal.

(6) The transmission and reception module of (1) to (5) described above, further includes a third inductor included in a third matching circuit provided between the duplexer and the transmission signal input terminal, in which on the substrate, a winding axis direction of a conductor of the first inductor and a winding axis direction of a conductor of the third inductor are different from each other.

(7) In the transmission and reception module of (6) described above, a winding axis direction of a conductor of the first inductor or a winding axis direction of a conductor of the third inductor is orthogonal to the substrate.

(8) In the transmission and reception module of (6) or (7) described above, the first inductor is inserted in series in a path connecting the duplexer and the antenna terminal, and the third inductor is inserted in series in a path connecting the duplexer and the transmission signal input terminal.

(9) In the transmission and reception module of (6) to (8) described above, a winding axis direction of a conductor of the second inductor and a winding axis direction of a conductor of the third inductor are different from each other on the substrate.

(10) In the transmission and reception module of (6) or (7) described above, the substrate is a multilayer substrate in which a plurality of wiring layers is laminated with an insulator layer interposed therebetween, and a wiring layer adjacent in a laminating direction to a wiring layer to which an inductor having a conductor winding axis direction orthogonal to the substrate among the first inductor, the second inductor, and the third inductor is connected is not provided with a GND wiring overlapping the inductor in a top view.

(11) In the transmission and reception module of (6) described above, a winding axis direction of a conductor of the second inductor is the same as a winding axis direction of a conductor of the third inductor, and a distance between the second inductor and the third inductor is larger than a distance between the first inductor and the second inductor and a distance between the first inductor and the third inductor.

(12) In the transmission and reception module of (11) described above, a winding axis direction of a conductor of the second inductor and a winding axis direction of a conductor of the third inductor are orthogonal to the substrate.

(13) The transmission and reception module of (1) to (12) described above, further includes a plurality of the duplexers.

(14) The transmission and reception module of (1) to (13) described above, further includes a plurality of the first matching circuits.

(15) The transmission and reception module of (1) to (14) described above, further includes a shield case covering a component mounting surface of the substrate.

According to the present disclosure, it is possible to realize a transmission and reception module capable of suppressing degradation of isolation characteristics and attenuation characteristics of a transmission and reception path.

What is claimed is:

1. A transmission and reception module comprising:
a substrate comprising a transmission signal input terminal, a reception signal output terminal, and an antenna terminal;
a duplexer that is on the substrate, the duplexer being configured to output a transmission signal input from the transmission signal input terminal to the antenna terminal, and configured to output a reception signal input from the antenna terminal to the reception signal output terminal;

a first inductor connected between the duplexer and the antenna terminal, the first inductor being part of a first matching circuit;
a second inductor connected between the duplexer and the reception signal output terminal, the second inductor being part of a second matching circuit; and
a third inductor connected between the duplexer and the transmission signal input terminal, the third inductor being part of a third matching circuit,
wherein on the substrate, a winding axis direction of a conductor of the first inductor and a winding axis direction of a conductor of the second inductor are different from each other,
wherein on the substrate, the winding axis direction of the conductor of the first inductor and a winding axis direction of a conductor of the third inductor are different from each other,
wherein the substrate is a multilayer substrate in which a plurality of wiring layers is laminated with an insulator layer interposed between the wiring layers, and
wherein a wiring layer adjacent in a laminating direction to a wiring layer to which the inductor having a conductor winding axis direction orthogonal to the substrate among the first inductor, the second inductor, and the third inductor is connected, is not provided with a ground wiring overlapping the inductor in a top view.

2. The transmission and reception module according to claim 1, further comprising:
an antenna switch circuit connected between the duplexer and the antenna terminal,
wherein the first matching circuit is connected between the duplexer and the antenna switch circuit.

3. The transmission and reception module according to claim 1, further comprising:
a low-noise amplifier circuit connected between the duplexer and the reception signal output terminal,
wherein the second matching circuit is connected between the duplexer and the low-noise amplifier circuit.

4. The transmission and reception module according to claim 1, wherein the winding axis direction of the conductor of the first inductor or the winding axis direction of the conductor of the second inductor is orthogonal to the substrate.

5. The transmission and reception module according to claim 1,
wherein the first inductor is connected in series in a path connecting the duplexer to the antenna terminal, and
wherein the second inductor is connected in series in a path connecting the duplexer to the reception signal output terminal.

6. The transmission and reception module according to claim 1, wherein the winding axis direction of the conductor of the first inductor or the winding axis direction of the conductor of the third inductor is orthogonal to the substrate.

7. The transmission and reception module according to claim 1,
wherein the first inductor is connected in series in a path connecting the duplexer to the antenna terminal, and
wherein the third inductor is connected in series in a path connecting the duplexer to the transmission signal input terminal.

8. The transmission and reception module according to claim 1, wherein on the substrate, the winding axis direction of the conductor of the second inductor and the winding axis direction of the conductor of the third inductor are different from each other.

9. The transmission and reception module according to claim 1, further comprising a plurality of the duplexers.

10. The transmission and reception module according to claim 1, further comprising a plurality of the first matching circuits.

11. The transmission and reception module according to claim 1, further comprising a shield case covering a component mounting surface of the substrate.

12. A transmission and reception module comprising:

a substrate comprising a transmission signal input terminal, a reception signal output terminal, and an antenna terminal;

a duplexer that is on the substrate, the duplexer being configured to output a transmission signal input from the transmission signal input terminal to the antenna terminal, and configured to output a reception signal input from the antenna terminal to the reception signal output terminal;

a first inductor connected between the duplexer and the antenna terminal, the first inductor being part of a first matching circuit;

a second inductor connected between the duplexer and the reception signal output terminal, the second inductor being part of a second matching circuit; and

a third inductor connected between the duplexer and the transmission signal input terminal, the third inductor being part of a third matching circuit, wherein on the substrate, a winding axis direction of a conductor of the first inductor and a winding axis direction of a conductor of the second inductor are different from each other, wherein on the substrate, the winding axis direction of the conductor of the first inductor and a winding axis direction of a conductor of the third inductor are different from each other, wherein the winding axis direction of the conductor of the second inductor is the same as the winding axis direction of the conductor of the third inductor, and wherein a distance between the second inductor and the third inductor is larger than a distance between the first inductor and the second inductor, and is larger than a distance between the first inductor and the third inductor.

13. The transmission and reception module according to claim 12, wherein the winding axis direction of the conductor of the second inductor and the winding axis direction of the conductor of the third inductor are orthogonal to the substrate.

* * * * *